United States Patent
Van De Sluis et al.

(10) Patent No.: US 9,497,819 B2
(45) Date of Patent: Nov. 15, 2016

(54) METHODS AND APPARATUS FOR CONTROLLING LIGHTING BASED ON USER MANIPULATION OF A MOBILE COMPUTING DEVICE

(71) Applicant: KONINKLIJKE PHILIPS N.V., Eindhoven (NL)

(72) Inventors: Bartel Marinus Van De Sluis, Eindhoven (NL); Dzmitry Viktorovich Aliakseyeu, Eindhoven (NL); Tatiana Aleksandrovna Lashina, Eindhoven (NL); Philip Steven Newton, Waalre (NL); Tim Dekker, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/889,562

(22) PCT Filed: Apr. 22, 2014

(86) PCT No.: PCT/IB2014/060896
§ 371 (c)(1),
(2) Date: Nov. 6, 2015

(87) PCT Pub. No.: WO2014/181205
PCT Pub. Date: Nov. 13, 2014

(65) Prior Publication Data
US 2016/0088707 A1    Mar. 24, 2016

Related U.S. Application Data

(60) Provisional application No. 61/820,867, filed on May 8, 2013.

(51) Int. Cl.
*H05B 33/08* (2006.01)
*H05B 37/02* (2006.01)
(Continued)

(52) U.S. Cl.
CPC ......... *H05B 33/0854* (2013.01); *G06F 1/1686* (2013.01); *G06F 1/1694* (2013.01);
(Continued)

(58) Field of Classification Search
CPC .............. H05B 33/0854; G06F 3/017; G06K 9/00335
USPC .................................................. 315/149, 292
See application file for complete search history.

(56) References Cited

U.S. PATENT DOCUMENTS 6,016,038 A    1/2000  Mueller et al.
6,211,626 B1   4/2001  Lys et al.
(Continued)

FOREIGN PATENT DOCUMENTS

EP    2362714 A1    8/2011
EP    2651190 A2    10/2013
(Continued)

OTHER PUBLICATIONS

Hecht, Jeff, "Photonic Frontiers: Gesture Recognition: Lasers Bring Gesture Recognition to the Home," Laser Focus World, 2011 (5 pages).

*Primary Examiner* — Don Le
(74) *Attorney, Agent, or Firm* — Meenakshy Chakravorty

(57) ABSTRACT

Disclosed are methods and apparatus for lighting control. One or more properties of light output are controlled based on user manipulation of a mobile computing device (110, 510) such as a mobile phone. Data from a mobile computing device may be utilized to implement lighting property adjustments for one or more LEDs (132) based on the data. The data may be user gesture data that is based on physical movement of the mobile computing device in space by the user.

19 Claims, 9 Drawing Sheets

(51) Int. Cl.
*G08C 17/02* (2006.01)
*G06F 1/16* (2006.01)
*G06F 3/0346* (2013.01)

(52) U.S. Cl.
CPC ............ *G06F 3/0346* (2013.01); *G08C 17/02* (2013.01); *H05B 37/0227* (2013.01); *H05B 37/0245* (2013.01); *H05B 37/0272* (2013.01); *G08C 2201/32* (2013.01); *G08C 2201/50* (2013.01); *G08C 2201/93* (2013.01)

(56) References Cited

U.S. PATENT DOCUMENTS

| | | | |
|---|---|---|---|
| 2006/0086888 A1 | 4/2006 | Eash | |
| 2009/0239587 A1 | 9/2009 | Negron et al. | |
| 2012/0019149 A1 | 1/2012 | Shih et al. | |
| 2012/0105217 A1 | 5/2012 | Kao et al. | |
| 2012/0184299 A1 | 7/2012 | Loveland et al. | |
| 2015/0029092 A1* | 1/2015 | Holz | G06F 3/017 345/156 |
| 2015/0215443 A1* | 7/2015 | Heo | H04M 1/0202 455/556.1 |
| 2016/0088707 A1* | 3/2016 | Van De Sluis | H05B 37/0227 315/149 |
| 2016/0098088 A1* | 4/2016 | Park | G06F 3/017 345/156 |
| 2016/0109954 A1* | 4/2016 | Harris | G06F 3/017 345/156 |

FOREIGN PATENT DOCUMENTS

| | | |
|---|---|---|
| WO | 2007095740 A1 | 8/2007 |
| WO | 2007132382 A2 | 11/2007 |
| WO | 2011024126 A2 | 3/2011 |
| WO | 2012052935 A1 | 4/2012 |
| WO | 2013085600 A2 | 6/2013 |

* cited by examiner

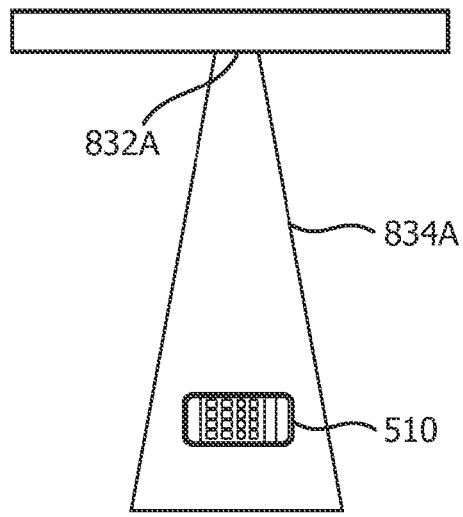
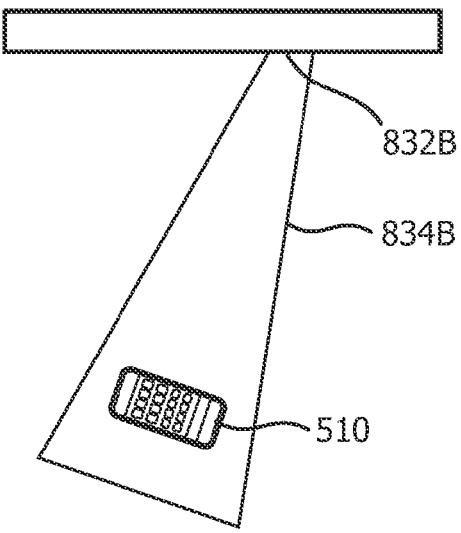
FIG. 8A   FIG. 8B
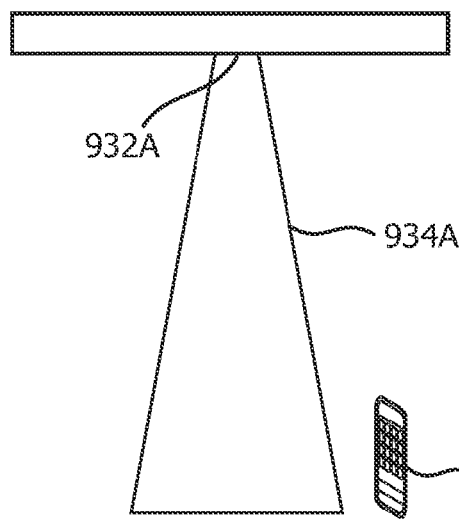
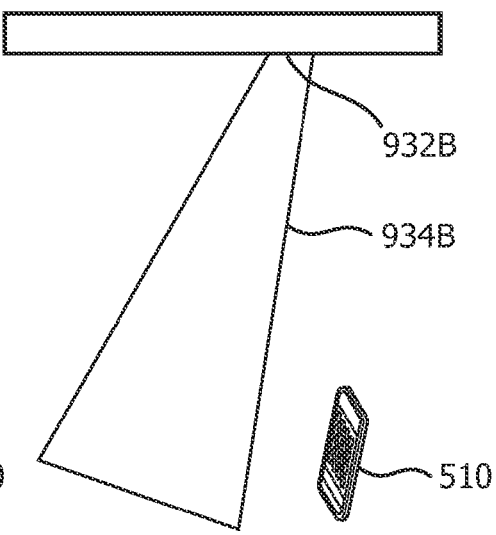
FIG. 9A   FIG. 9B

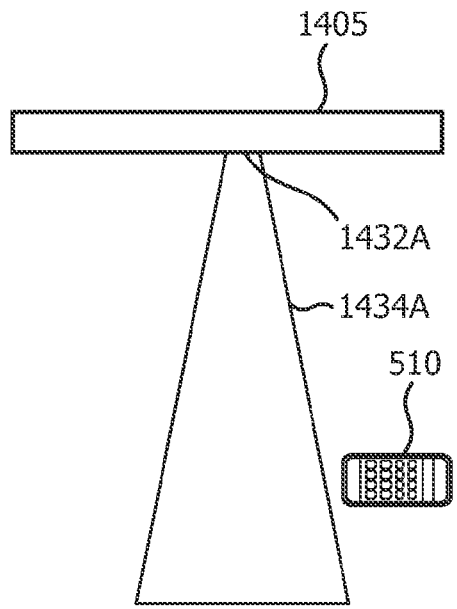
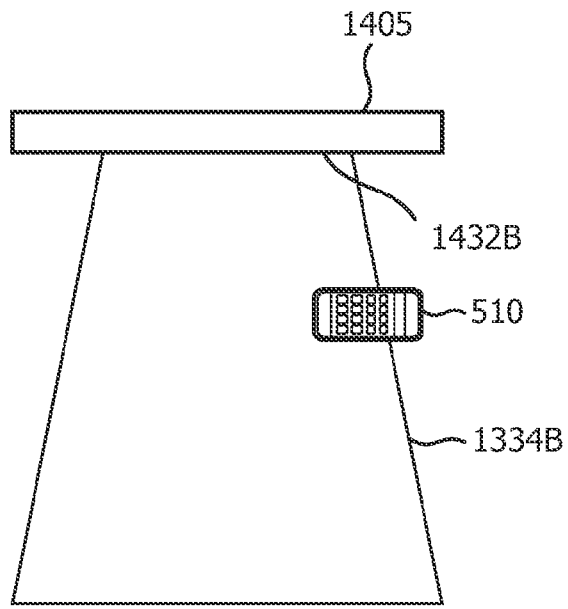
FIG. 14A    FIG. 14B
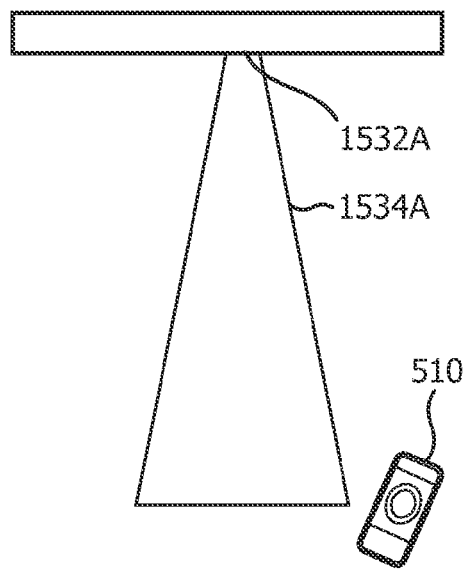
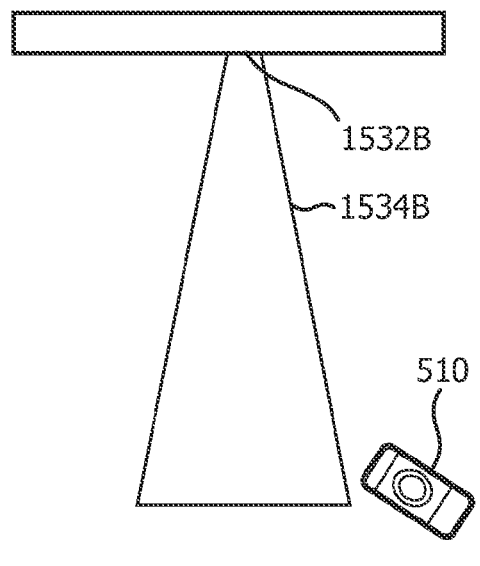
FIG. 15A    FIG. 15B

METHODS AND APPARATUS FOR CONTROLLING LIGHTING BASED ON USER MANIPULATION OF A MOBILE COMPUTING DEVICE

CROSS-REFERENCE TO PRIOR APPLICATIONS

This application is the U.S. National Phase application under 35 U.S.C. §371 of International Application No. PCT/IB2014/060896, filed on Apr. 22, 2014, which claims the benefit of U.S. Provisional Patent Application No. 61/820,867, filed on May 8, 2013. These applications are hereby incorporated by reference herein.

TECHNICAL FIELD

The present invention is directed generally to lighting control. More particularly, various inventive methods and apparatus disclosed herein relate to controlling one or more properties of light output based on user manipulation of a mobile computing device.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

In lighting systems such as those that include LED-based light sources, it is desirable to have control over one or more light sources of the lighting system. For example, it may be desirable to have control of which of a plurality of light sources are illuminated and/or control of one or more lighting parameters of one or more of the light sources. For example, it may be desirable to control color, color temperature, intensity, beam width, and/or beam direction of light output provided by one or more LED-based light sources.

Direct specification during configuration of the one or more light sources enables specification of lighting parameters. However, direct specification may suffer from one or more drawbacks such as lack of ability to fine-tune applied lighting, lack of flexibility for adapting to newly-introduced environmental objects, and/or lack of tailoring of lighting parameters to specific objects. Sensing of objects and directing lighting to the sensed objects may also enable automatic specification of lighting parameters. However, such specification may suffer from one or more drawbacks such as lack of ability to fine-tune applied lighting and/or lack of tailoring of lighting parameters to specific objects. Additional and/or alternative drawbacks of direct specification, automatic specification, and/or other specifications may be presented.

Thus, there is a need in the art to provide methods and apparatus that enable control of one or more properties of light output and that optionally overcome one or more drawbacks of existing apparatus and/or methods.

SUMMARY

The present disclosure is directed to lighting control. More particularly, various inventive methods and apparatus disclosed herein relate to controlling one or more properties of light output based on based on user manipulation of a mobile computing device, such as a mobile phone. For example, in some embodiments, data from a mobile computing device may be utilized to implement lighting property adjustments for one or more LEDs based on the data. The data may be user gesture data that is responsive to physical movement of the mobile computing device in space by the user.

Generally, in one aspect, the invention relates to a method of adjusting lighting via input from a mobile computing device that includes the steps of: establishing a connection with a mobile computing device of a user; receiving user gesture data from the mobile computing device in response to at least one physical movement of the mobile computing device in space by the user; determining lighting property adjustments for light output produced by one or more LEDs of a LED-based lighting unit based on the user gesture data; and implementing the lighting property adjustments in response to the user gesture data.

In some embodiments, the method further includes receiving a lighting property adjustment completion indication from the mobile computing device and fixing the lighting property adjustments in response to the lighting property adjustment completion indication.

In some embodiments, the method further includes receiving a lighting property adjustment initiation indication from the mobile computing device and implementing the lighting property adjustments in response to the lighting property initiation indication.

In some embodiments, the method further includes providing at least one user gesture data reference output, wherein the user gesture data is based on the user gesture data reference output. In some versions of those embodiments the user gesture data reference output includes at least one magnetic field and the user gesture data is indicative of strength of the magnetic field at the mobile computing device. In some versions of those embodiments the user gesture data reference output includes a plurality of coded light outputs and the user gesture data is indicative of receipt of at least one of the coded light outputs at an optical sensing device of the mobile computing device. The user gesture data reference output may optionally include a first coded light output generated by a first LED of the LEDs and a second coded light output generated by a second LED of the LEDs, and the user gesture data may be indicative of receipt of the first coded light output and the second coded light output. The user gesture data may be indicative of receipt of the first coded light output and the second coded light output simultaneously. The user gesture data may be indicative of a first strength of the first coded light output and a second strength of the second coded light output. Determining the lighting property adjustments for the one or more LEDs may be based on the first strength and the second strength.

In some embodiments, the method further includes receiving target area data from the mobile computing device, the target area data indicative of a target area for light output of the one or more LEDs; wherein determining the lighting property adjustments for one or more LEDs is based on the target area data to maintain the light output in the target area.

In some embodiments, the method further includes terminating the connection with the mobile computing device.

In some embodiments, establishing the connection with the mobile computing device includes generating an identifier for the LED-based lighting unit, the identifier being readable by the mobile computing device. In some versions of those embodiments, the identifier may include a coded light identifier in light output of one or more of the LEDs and/or a near-field communication identifier.

In some embodiments, the space is in the path of light output from the one or more LEDs of the LED-based lighting unit.

In some embodiments, the method further includes: receiving additional user gesture data from the mobile computing device in response to further physical movement of the mobile computing device; determining that further lighting property adjustments are unable to be made for one or more LEDs of a LED-based lighting unit based on the additional user gesture data; and alerting the user that the further lighting property adjustments are unable to be made. In some versions of those embodiments the step of alerting the user that the further lighting property adjustments are unable to be made includes sending a feedback command to the mobile computing device to effectuate at least one of an audible, visual, and tactile alert via the mobile computing device.

Generally, in another aspect, the invention relates to a method of providing user gesture data to at least one lighting controller to adjust lighting that includes the steps of: establishing a connection with at least one lighting controller controlling one or more LEDs of a LED-based lighting unit; identifying physical movement data via at least one sensor of a mobile computing device; determining user gesture data based on the physical movement data; and providing the user gesture data to the lighting controller to implement lighting property adjustments for light output from the one or more LEDs based on the user gesture data.

In some embodiments, the method further includes identifying a lighting property adjustment completion indication and providing the lighting property adjustment completion indication to the lighting controller to fix the lighting property adjustments for the one or more LEDs.

In some embodiments, the method further includes identifying a lighting property adjustment initiation indication and providing the lighting property adjustment initiation indication to the lighting controller to implement the lighting property adjustments for the one or more LEDs.

In some embodiments, the method further includes receiving at least one user gesture data reference output via the sensor, wherein the physical movement data is based on the user gesture data reference output. In some versions of those embodiments the user gesture data reference output includes at least one magnetic field, the sensor includes a magnetic field sensing transducer, and the physical movement is identified based on sensing of the magnetic field via the magnetic field sensing transducer. In some versions of those embodiments the user gesture data reference output includes a plurality of coded light outputs, the sensor includes an optical sensing device, and the physical movement data is based on receipt of at least one of the coded light outputs at the optical sensing device. The received coded light outputs may include a first coded light output generated by a first LED of the LEDs and a second coded light output generated by a second LED of the LEDs, and the user gesture data may be indicative of receipt of the first coded light output and the second coded light output. The user gesture data may be indicative of receipt of the first coded light output and the second coded light output simultaneously. The user gesture data may be indicative of a first strength of the first coded light output and a second strength of the second coded light output.

In some embodiments, the method further includes determining target area data based on anchor area input received via the mobile computing device, the target area data indicative of a target area for light output of the one or more LEDs and based on the position of the mobile computing device when the target area input is received.

In some embodiments, the method further includes terminating the connection with the lighting controller.

In some embodiments, the physical movement is in the path of light output from the one or more LEDs for which the lighting property adjustments are implemented based on the user gesture data.

In some embodiments, the method further includes: identifying further physical movement of the mobile computing device; determining additional user gesture data based on the further physical movement; providing the additional user gesture data to the lighting controller to implement further lighting property adjustments for the one or more LEDs based on the additional user gesture data; and receiving an alert that the further lighting property adjustments are unable to be made. In some versions of those embodiments the step of receiving the alert that the further lighting property adjustments are unable to be made includes receiving a feedback command to effectuate at least one of an audible, visual, and tactile alert via the mobile computing device.

Generally, in another aspect, the invention relates to a method of adjusting lighting via input from a mobile computing device that includes the steps of: establishing a connection with a mobile computing device of a user; providing a first reference output from a first LED group; providing a second reference output from a second LED group; receiving data from a mobile computing device in response to receipt of the first reference output and the second reference output via at least one sensor of the mobile computing device, the data including first strength information indicative of strength of the first reference output at the mobile computing device and second strength information indicative of strength of the second reference output at the mobile computing device; determining lighting property adjustments for light output from the first LED group and the second LED group based on the first strength information and the second strength information; and implementing the lighting property adjustments.

In some embodiments, the method further includes determining the lighting property adjustments based on comparison of the first strength information and the second strength information. In some versions of those embodiments the lighting property adjustments include light output direction adjustment of light output of at least one of the first LED group and the second LED group. In some versions of those embodiments determining the lighting property adjustments includes determining the first strength information is less indicative of strength than the second strength information, and determining a light output direction adjustment for light output the first LED group based on determining the first strength information is less indicative of strength than the second strength information. In some versions of those embodiments the method further includes receiving further data from the mobile computing device, the further data including further first strength information indicative of strength of the first reference output at the mobile computing device, and determining a further light output direction adjustment for the first LED group if the further first strength fails to satisfy a threshold strength. In some embodiments, the first LED group consists of a single LED.

In some embodiments, the first reference output includes a first coded light output and the second reference output includes a second coded light output, the first strength information is indicative of intensity of the first coded light output at an optical sensing device of the mobile computing device, and the second strength information is indicative of intensity of the second coded light output at the optical sensing device.

In some embodiments, the method further includes determining movement of the mobile computing device based on comparison of the first strength information and the second strength information and determining the lighting property adjustments based on the movement. In some versions of those embodiments the method further includes determining a shape of the movement of the mobile computing device based on comparison of the first strength information and the second strength information and determining the lighting property adjustments based on the shape of the movement.

Generally, in still another aspect, the invention relates to a lighting apparatus including a memory and a controller operable to execute instructions stored in the memory. The instructions include instructions to: establish a connection with a mobile computing device of a user; receive user gesture data from the mobile computing device in response to at least one physical movement of the mobile computing device in space by the user; determine lighting property adjustments for light output produced by one or more LEDs of a LED-based lighting unit based on the user gesture data; and implement the lighting property adjustments in response to the user gesture data.

Generally, in another aspect, a lighting system is provided that includes: at least one LED-based lighting unit having at least one adjustable lighting property; at least one controller in electrical communication with said light source; wherein the at least one controller: establishes a connection with a mobile computing device of a user; receives user gesture data from the mobile computing device in response to at least one physical movement of the mobile computing device in space by the user; determines lighting property adjustments for light output produced by one or more LEDs of a LED-based lighting unit based on the user gesture data; and implements the lighting property adjustments in response to the user gesture data.

Other embodiments may include a non-transitory computer readable storage medium storing instructions executable by a processor to perform a method such as one or more of the methods described herein. Yet other embodiments may include a system including memory and one or more processors operable to execute instructions, stored in the memory, to perform a method such as one or more of the methods described herein.

As used herein for purposes of the present disclosure, the term "LED" should be understood to include any electroluminescent diode or other type of carrier injection/junction-based system that is capable of generating radiation in response to an electric signal and/or acting as a photodiode. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyroluminescent sources, luminescent polymers, etc.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The terms "lighting fixture" and "luminaire" is used interchangeably herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 8A and 8B illustrate another example lighting manipulation gesture via physical movement of a mobile computing device.

FIGS. 9A and 9B illustrate another example lighting manipulation gesture via physical movement of a mobile computing device.

FIGS. 14A and 14B illustrate another example lighting manipulation gesture via physical movement of a mobile computing device.

FIGS. 15A and 15B illustrate another example lighting manipulation gesture via physical movement of a mobile computing device.

DETAILED DESCRIPTION

Figure 1:
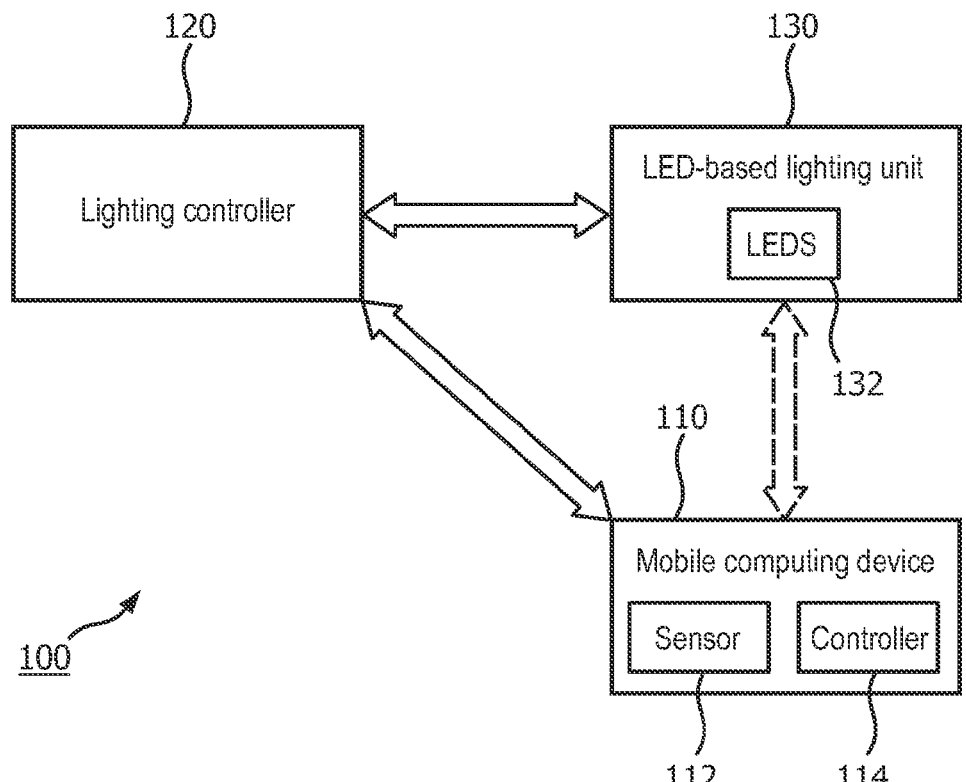
FIG. 1 illustrates a block diagram of an embodiment of a LED-based lighting system having a lighting controller and an LED-based lighting unit; a mobile computing device is illustrated interfacing with the LED-based lighting system.

In lighting systems, such as those that include LED-based light sources, it is desirable to have control over one or more light sources of the lighting system. For example, it may be desirable to have control of a lighting scene, lighting direction, lighting color, illumination intensity, beam width, beam angle, and/or other parameters of light output of one or more of the light sources. Direct specification during configuration of the one or more light sources and/or sensing of objects may each enable specification of one or more lighting parameters. However, direct specification and/or sensing of objects may suffer from one or more drawbacks such as lack of ability to fine-tune applied lighting, lack of flexibility, and/or lack of tailoring of lighting parameters.

Thus, Applicants have recognized and appreciated a need in the art to provide methods and apparatus that enable control of one or more properties of light output and that optionally overcome one or more drawbacks of existing apparatus and/or methods. More generally, Applicants have recognized and appreciated that it would be beneficial to provide various inventive methods and apparatus related to controlling one or more properties of light output based on user manipulation of a mobile computing device.

In view of the foregoing, various embodiments and implementations of the present invention are directed to lighting control.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, aspects of the methods and apparatus disclosed herein are described in conjunction with a lighting system having only LED-based light sources. However, one or more aspects of the methods and apparatus described herein may be implemented in other lighting systems that additionally and/or alternatively include other non-LED light sources. Implementation of the one or more aspects described herein in alternatively configured environments is contemplated without deviating from the scope or spirit of the claimed invention. Also, for example aspects of the methods and apparatus disclosed herein are described in conjunction with a single controller and single lighting unit. However, one or more aspects of the methods and apparatus described herein may be implemented in other lighting systems that may include multiple controllers and/or multiple lighting units.

FIG. 1 illustrates a block diagram of an embodiment of a LED-based lighting system 100 having a lighting controller 120 and an LED-based lighting unit 130. A mobile computing device 110 is illustrated interfacing with the LED-based lighting system 100. The mobile computing device 110 may be, for example, a mobile phone (e.g., a smart phone), a tablet computing device, and/or a wearable computing device (e.g., a wearable watch computing device). The LED-based lighting unit 130 includes one or more LEDs 132 that are configured to generate light output. As discussed herein, the lighting controller 120 controls the LEDs 132 of the LED-based lighting unit 130 and/or one or more optical elements associated with the LEDs 132 based at least in part on data received from the mobile computing device 110. For example, user gesture data may be received from the mobile computing device 110 in response to physical movement of the mobile computing device 110 in space by the user, lighting property adjustments for the LEDs 132 determined based on the user gesture data, and the LEDs 132 and/or optical elements controlled to implement the lighting property adjustments.

The mobile computing device 110 includes a controller 114 and at least one sensor 112. In some embodiments the sensor 112 may be utilized to identify physical movement data indicative of physical movement of the mobile computing device 110. The controller 114 may utilize the physical movement data to determine user gesture data for providing to the lighting controller 120 for adjusting light output based on the user gesture data. In some embodiments the sensor 112 may be utilized to identify a reference output provided by the LED-based lighting system 100 and the controller 114 may utilize the reference output to determine data for providing to the lighting controller 120 for adjusting light output. The sensor 112 may include, for example, a camera, a magnetic field sensing transducer (e.g., a hall-effect sensor), a GPS sensor, and/or an orientation sensor (e.g., a magnetometer, gyrocompass, gyroscope; accelerometer; three-axis electronic compass). For example, an orientation sensor may be utilized to identify physical movement data indicative of pitch, heading, and/or roll of the mobile computing device 110 and the user gesture data may be indicative of the pitch, heading, and/or roll. The user gesture data may be provided to the lighting controller 120 to adjust one or more lighting properties of the LED-based lighting unit 130 based on the user gesture data. For example, the light output from one or more of the LEDs 132 of the LED-based lighting unit 130 may be adjusted to generate a light output having a beam direction that generally corresponds the heading, pitch, and/or roll of the mobile computing device 110. The beam direction may be adjusted by, for example, activating certain LEDs and/or adjusting an optical element associated with certain LEDs. Heading generally references the orientation of a particular element to the Earth's magnetic poles or the rotational orientation of the element about a nadir axis. Pitch generally references the rotation of the particular element about a second axis perpendicular to the nadir axis. Roll generally references the rotation of the particular element about a third axis perpendicular to the nadir axis and the second axis.

The mobile computing device 110 may include at least one communication interface to enable the mobile computing device 110 to network with one or more other components such as the lighting controller 120. Likewise, the lighting controller 120 may include and/or be coupled to at least one communication interface to enable the lighting controller 120 to network with one or more other components such as the mobile computing device 110 and/or the LED-based lighting unit 130. Communication between the mobile computing device 110 and the lighting controller 120 may occur through, for example, near-field communication, Bluetooth, Wi-Fi, and/or other communication protocols.

The lighting controller 120 may include and/or access a storage subsystem containing programming and data constructs that provide the functionality of some or all of the modules described herein. For example, the storage subsystem may include the logic to determine lighting property adjustments for one or more LEDs based on data received from a mobile computing device and/or implement the lighting property adjustments in response to the data. The mobile computing device 110 may also include and/or access a storage subsystem containing programming and data constructs that provide the functionality of some or all of the modules described herein. For example, the storage subsystem may include the logic to identify physical movement data, determine user gesture data based on the physical movement data, and/or to provide user gesture data to at least one lighting controller to adjust lighting.

The modules implementing the functionality of certain embodiments are generally executed by respective of lighting controller 120 and controller 114 alone or in combination with other controllers (e.g., distributed processing). Memory may be used in the storage subsystem of lighting controller 120 and/or mobile computing device 110 and may be accessed by respective of lighting controller 120 and controller 114. Memory can include a number of memories including a main random access memory (RAM) for storage of instructions and data during program execution and a read only memory (ROM) in which fixed instructions are stored. A file storage subsystem can provide persistent storage for program and data files, and may include a hard disk drive, a floppy disk drive along with associated removable media, a CD-ROM drive, an optical drive, or removable media cartridges.

In some embodiments the lighting controller 120 controls the LED-based lighting unit 130 based at least in part on data received from the mobile computing device 110. In some embodiments the LEDs 132 of the LED-based lighting unit 130 are driven by one or more drivers and the lighting controller 120 communicates with the one or more drivers to control the LEDs. In some embodiments the lighting controller 120 may form part of the driver for the LED-based lighting unit 130. In some embodiments the lighting controller 120 communicates with one or more local lighting controllers of the LED-based lighting unit 130 to control the LEDs 132. For example, a plurality of local lighting controllers may be provided, each controlling one or more LEDs 132 of the LED-based lighting unit 130. In some embodiments the lighting controller 120 itself may include a plurality of local controllers, each controlling one or more LEDs 132 of the LED-based lighting unit 130. The lighting controller 120 may control a single group of LEDs 132 of the LED-based lighting unit 130 or may control multiple groups of LEDs 132. Embodiments including multiple lighting controllers may optionally incorporate wired and/or wireless communication between the multiple lighting controllers.

In some embodiments, the LED-based lighting unit 130 may include a plurality of LED groupings each including one or more of the LEDs 132. For example, in some embodiments the LED groupings may each include at least one surface of LEDs and/or one or more portions of a surface of LEDs. A surface of LEDs may include a flat surface, an arcuate surface, a multi-faceted surface, and/or other surface that includes one or more LEDs. Some examples of surfaces of LEDs include a wall, a ceiling, a floor, a column (e.g., a round column, a square column, an elliptical column). One or more aspects of the control of each of the LED groupings may optionally be specific to the individual LED grouping. For example, the intensity, color, beam width, and/or beam direction of one or more LED groupings may be individually controlled. For example, beam direction of a plurality of LED groupings may be redirected to focus the beams on an object.

Figure 2:
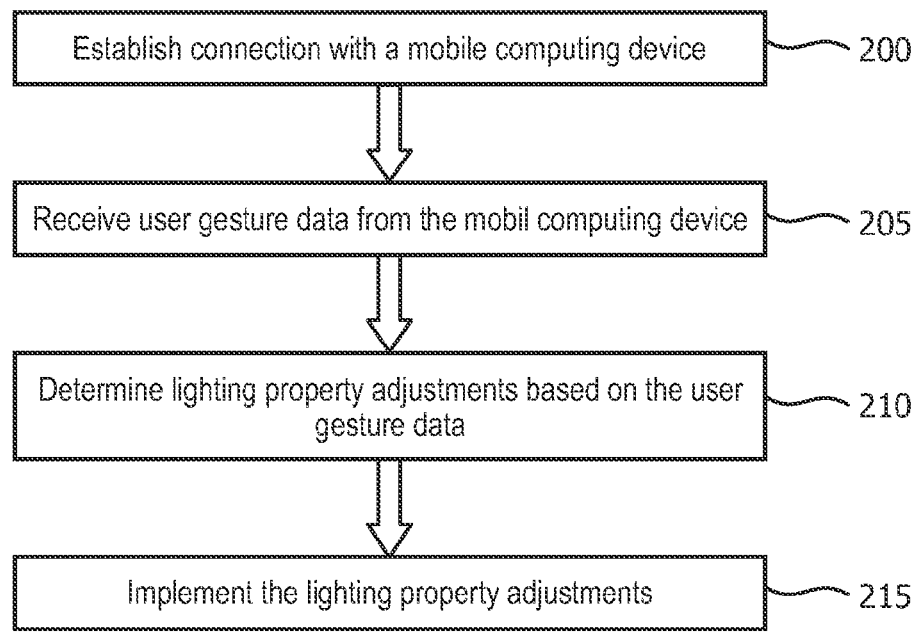
FIG. 2 illustrates a flow chart of an example method of adjusting lighting via input from a mobile computing device.

Referring to FIG. 2, a flow chart of an example method of adjusting lighting via input from a mobile computing device is illustrated. Other implementations may perform the steps in a different order, omit certain steps, and/or perform different and/or additional steps than those illustrated in FIG. 2. For convenience, aspects of FIG. 2 will be described with reference to one or more components of a lighting system that may perform the method. The components may include, for example, one or more of the components of lighting system 100 of FIG. 1 and/or one or more components of FIGS. 5A-16B. Accordingly, for convenience, aspects of FIGS. 1 and 5A-16B will be described in conjunction with FIG. 2.

At step 200 a connection with a mobile computing device is established. For example, the lighting controller 120 may establish a connection with the mobile computing device 110. In some embodiments a connection may be established in response to a user action with the mobile computing device 110. In some embodiments the user action may be directed particularly to a group of one or more LEDs the user wishes to control.

Figure 5A:
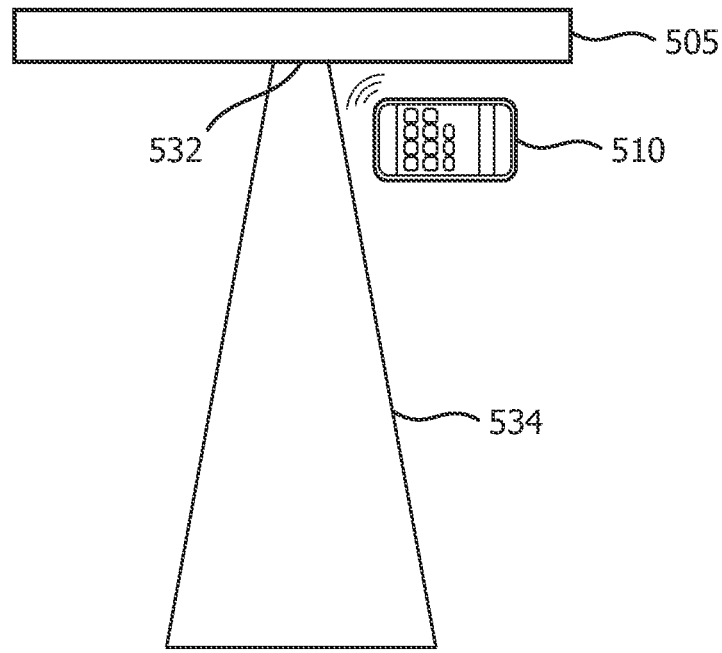
FIGS. 5A and 5B illustrate examples of establishing a connection between a mobile computing device and a lighting controller.

For example, as illustrated in FIG. 5A, a mobile phone 510 may be placed in close proximity with a grouping of LEDs 532 on surface 505 and communication between the mobile phone 510 and a lighting controller controlling the LEDs established in response to such placement. For example, near-field communication (NFC), a radio-frequency identification (RFID) tag, and/or other radio-frequency (RF) device and/or methods may be implemented near the LEDs to initiate a connection with the mobile phone 510. For example, in some embodiments an unpowered NFC tag and/or a powered NFC device may be implemented near the LEDs 532 and provide connection initiation data that may be received by an NFC sensor of mobile phone 510 to initiate a connection between a lighting controller of the LEDs and the mobile phone 510. Also, for example, in some embodiments connection initiation data may additionally and/or alternatively be provided by the mobile phone 510 and received by the lighting controller to initiate a connection between the lighting controller and the mobile phone 510.

Figure 5B:
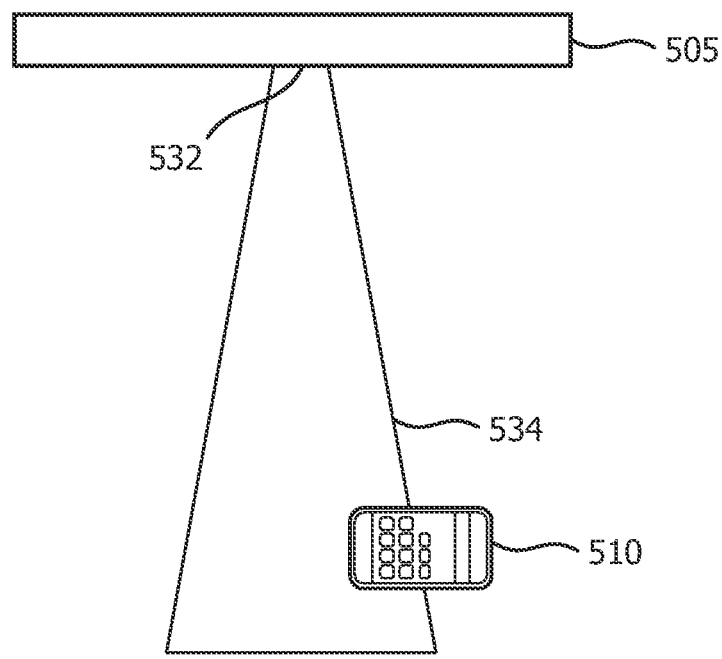

Also, for example, as illustrated in FIG. 5B, in some embodiments one or more of the LEDs 532 may provide encoded light that includes connection initiation data. A camera or other sensor of the mobile phone 510 may be utilized to receive the encoded light and a controller of the mobile phone 510 utilized to identify the connection initiation data in the encoded light. For example, a light output 134 produced by LEDs may be received by a camera of the mobile phone 510 by moving the mobile phone 510 into the light output 534. As discussed, the light output 534 may be coded light output that includes connection initiation data. The connection initiation data may be utilized by the mobile phone 510 to initiate connection with a lighting controller associated with the LEDs 532.

In some embodiments, any connection initiation data optionally provided to the mobile phone 510 may include a lighting controller identifier. The lighting controller identifier may be utilized to establish a separate network connection between the lighting controller and the mobile phone 510, such as a connection utilizing Wi-Fi and/or blue-tooth protocols. For example, it may be utilized by the mobile phone 510 to establish a connection with the lighting controller. In some embodiments any connection initiation data optionally provided to the lighting controller by the mobile phone 510 may include a mobile phone identifier. The mobile phone identifier may be utilized to establish a separate network connection between the lighting controller and the mobile phone 510. For example, it may be utilized by the lighting controller to establish a connection between the lighting controller and the mobile phone 510.

In some embodiments, the connection initiation data and/or additional data provided by the lighting controller via the separate network connection may be utilized by the mobile phone 510 to initiate a lighting control application on the mobile phone 510. For example, the connection initiation data and/or additional data may include lighting control application program data that itself may include code to be executed by the mobile phone 510 to execute the lighting control application on the mobile phone 510. Also, for example, the connection initiation data and/or additional data may include lighting control application location data that may be utilized by the mobile phone 510 to execute the lighting control application on the mobile phone 510 and/or access the lighting control application via the mobile phone 510. For example, lighting control application location data may provide an Internet address from which lighting control application code may be received and executed on the mobile phone 510. Also, for example, lighting control application location data may provide an Internet address the mobile phone 510 may utilize to access the lighting control application. For example, the lighting control application may execute on a remote computing device and the mobile phone 510 may access the lighting control application via a web browser of the mobile phone to enable use of the lighting control application.

In some embodiments, the connection initiation data may additionally or alternatively include a LED group identifier that identifies a particular group of one or more LEDs to be controlled. For example, in FIGS. 5A and 5B an LED group identifier may identify the LEDs 532 producing the light output 534. In some embodiments the lighting controller identifier and the LED group identifier may be the same. For example, in some embodiments the LED group may be the only LED group controlled by the lighting controller. In some embodiments the lighting controller identifier and the LED group identifier may be different. For example, in some embodiments multiple LED groups may be controlled by the lighting controller and the LED group identifier may be utilized to indicate which LED group to control via the mobile phone 510.

In some embodiments, multiple lighting controllers and/or multiple LED groups may be controlled via the mobile phone 510. For example, a sensor of the mobile phone 510 may receive connection initiation data from multiple LED groups either simultaneously or at different times. Connection may be established between the mobile phone 510 and one or more lighting controllers controlling the multiple LED groups and the multiple LED groups simultaneously controlled via the mobile phone 510. For example, in some embodiments a sensor of the mobile phone 510 may simultaneously receive connection initiation data associated with a first LED group and connection initiation data associated with a second LED group. Also, for example, in some embodiments a sensor of the mobile phone 510 may receive the first connection initiation data associated with the first LED group at a first position of the mobile phone 510, the mobile phone 510 may be moved by a user to a second position, and the mobile phone 510 may then receive the second connection initiation data associated with the second LED group. The connection initiation data may be utilized to establish communication with one or more lighting controllers controlling the first and second LED groups. For example, a single lighting controller may control the first and second LED groups or a first lighting controller may control the first LED group and a second lighting controller may control the second LED group.

Also, for example, a lighting controller may receive mobile phone identification data from multiple sensors (e.g., NFC sensors) each associated with a unique LED group either simultaneously or at different times. Connection may be established with the mobile phone 510 by the lighting controller, and the multiple LED groups may be simultaneously controlled by the lighting controller via received data from the mobile phone 510. For example, in some embodiments lighting controller 120 may receive input from a first sensor indicating mobile phone identification data from mobile phone 510 and may receive input from a second sensor also indicating mobile phone identification data from mobile phone 510. The first sensor may be associated with a first LED group and the second sensor may be associated with a second LED group. The mobile phone identification data may be received, for example, via placement of the mobile phone 510 near NFC sensors associated with the first and second LED groups. The lighting controller may establish connection with the mobile phone 510 and enable simultaneous control of the first LED group and the second LED group via the mobile phone 510.

The lighting control application may optionally be utilized to select one or more LED groups to control simultaneously and/or to deselect one or more LED groups from being controlled simultaneously with other LED groups. For example, when connection initiation data associated with a first LED group and connection initiation data associated with a second LED group are received, a user may confirm a grouping of the first and second LED group via the lighting control application. Also, for example, when connection initiation data associated with a first LED group and connection initiation data associated with a second LED group are received, a user may choose to control only one of the first LED group and the second LED group via the lighting control application.

In some embodiments, the user action to establish connection may be directed particularly to a group of one or more LEDs the user wishes to control by accessing the lighting control application on the mobile phone 510 and selecting the group of one or more LEDs from a display of LED groups to control. For example, the lighting control application may display a mapping and/or other listing of LED groups that may be controlled and the user may select one or more of the LED groups utilizing the mobile phone 510. Any mapping and/or other listing may optionally be provided with descriptors, visual indications, and/or other identifiers of the LED groups to enable a user to identify a desired LED group. In some embodiments the lighting control application may identify the LED groups that may be controlled via network communication with one or more lighting controller controlling those LED groups. For example, a lighting controller may provide a listing of the LED groups to the lighting control application via network communication with the mobile phone 510. In some embodiments a user may select a group of one or more LEDs via the lighting control application and the lighting controller may cause the group to provide a visual indication of the group that has been selected via low frequency pulsating of one or more LEDs of the group and/or other visual indication by one or more LEDs. For example, the lighting controller may direct one or more LEDs to blink several times and/or cause one or more of the LEDs to provide light of a certain color for a duration of time. As discussed, any lighting control application accessed via the mobile phone 510 may execute on the mobile phone 510 and/or one or more remote computing devices.

In some embodiments, connection between the mobile computing device and one or more lighting controllers may be initiated in response to a user indication of a LED lighting configuration. For example, a user action may trigger the LED lighting configuration. For example, actuating a button or user interface via the mobile computing device 120 (e.g., selection of a user interface element in the lighting control application) may trigger the LED lighting configuration. Also, for example, in some embodiments the LED lighting configuration may be initiated in response to movement of the mobile computing device 510 so that the mobile computing device 510 receives connection initiation data. In some embodiments the received connection initiation data must be of at least a threshold strength before the LED lighting configuration is initiated. For example, in embodiments where communication initiation data is included in coded light, the coded light must be of at least a threshold intensity level. Also, for example, in embodiments where communication initiation data is included in NFC data, the NFC field must be of at least a threshold intensity level.

In some embodiments, authentication may be required to establish connection between a mobile computing device and a lighting controller. For example, only certain mobile computing devices may be identified as authenticated to establish connection with the lighting controller. Also, for example, upon installing and/or executing a lighting control application a user may be required to provide authentication information such as a username and/or password. Additional and/or alternative forms of user and/or mobile computing device authentication may be utilized.

At step 205 user gesture data is received from the mobile computing device. For example, the lighting controller 120 may receive user gesture data from the mobile computing device 110. The user gesture data may be provided via the connection established between the lighting controller 120 and the mobile computing device 110 at step 200. The user gesture data may be received from the mobile computing device 110 in response to physical movement of the mobile computing device 110 in space by the user. As discussed herein, user gesture data may be determined based on input (physical movement data) received via one or more sensor 112 of the mobile computing device 110. In some embodiments user gesture data may be determined by the mobile computing device 110 as described with respect to step 310 of FIG. 3.

At step 210 at least one lighting property adjustment is determined based on the user gesture data. For example, a lighting property adjustment of the intensity, color, beam width, and/or beam direction of light output provided by one or more LEDs may be determined based on the user gesture data. At step 215 the lighting property adjustments determined at step 210 are implemented. For example, the lighting controller may implement the lighting property adjustments by activating one or more LEDs, deactivating one or more LEDs, changing light output characteristics (e.g., color, brightness, color temperature) of one or more LEDs, and/or altering one or more mechanical and/or electrical optical structures associated with one or more LEDs (e.g., repositioning optical lenses associated with one or more LEDs, changing optical characteristics of one or more optical lenses). Numerous examples are provided below with reference to FIGS. 6A-16B of example lighting property adjustments that may be determined based on user gesture data and implementation of those lighting property adjustment. In the examples, the user gestures via the mobile phone 510 will be described, the lighting property adjustments that may be made based on user gesture data responsive to the user gestures described, and implementation of the lighting property adjustments described. One of ordinary skill in the art, having had the benefit of the present disclosure, will recognize and appreciate that additional and/or alternative adjustments may be made in response to the user gestures illustrated and/or in response to additional and/or alternative user gestures.

Figure 6A:
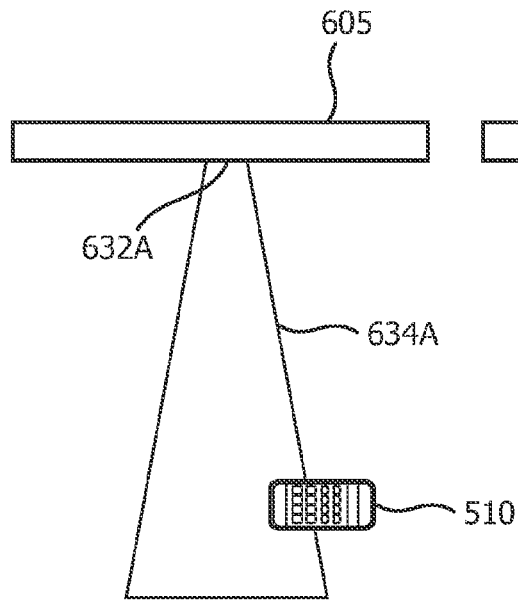
FIGS. 6A and 6B illustrate an example lighting manipulation gesture via physical movement of a mobile computing device that may be utilized in a LED-based lighting system to adjust lighting properties.
Figure 6B:
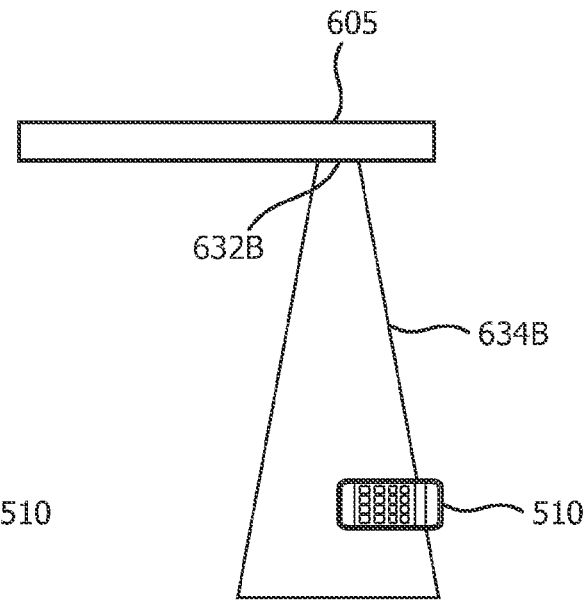

With reference to FIGS. 6A and 6B, a light output 634A produced by LEDs 632A of surface 605 is substituted with a light output 634B produced by LEDs of surface 605 based on user movement of the mobile phone 510 from the position of FIG. 6A to the position of FIG. 6B. The light output 634B is provided by different LEDs at a different location than the light output 634A. As illustrated in FIG. 6A, the mobile phone 510 may be moved into the light output 634A produced by the LEDs 632A and a camera of the mobile phone 510 utilized to sense the light output 634A. In some embodiments the light output 634A may optionally be coded light output specific to the LEDs 632A. The mobile phone 510 may optionally utilize data from the camera sensing the light output 634A to determine user gesture data that indicates the mobile phone 510 is sensing the light output 634A. The user may then move the mobile phone 510 to another location as illustrated in FIG. 6B. In some embodiments a user of the mobile phone 510 may provide a specific user input via the mobile phone 510 (e.g., press a button or on-screen element within a lighting control application) in order to "grab" the light output 634A and then make the movement of the mobile phone 510 to the location in FIG. 6B. The user input may be provided to the lighting controller to indicate the mobile phone 510 is going to be moved to a new location and that lighting should be provided to the new location.

Light output 634B from LEDs 632B may be generated and sensed by the camera of the mobile phone 510. In some embodiments the light output 634B may optionally be coded light output specific to the LEDs 632B. In some embodiments the light output 634B may optionally be provided in response to user gesture data provided by the mobile phone 510 indicating it is no longer sensing the light output 634A and/or in response to user input indicating the mobile phone 510 is going to be moved to a new location. The mobile phone 510 may provide user gesture data that indicates it is sensing the light output 634B when it is in the location of FIG. 6B. Based on such user gesture data, a lighting controller may determine that the lighting property adjustment that should be made is that light output 634B should be provided. As discussed herein, the user gesture data may be based on data received via a camera of the mobile phone 510 in response to the camera sensing the provided light output.

In some embodiments light output from multiple LED groupings surrounding LEDs 632A may be provided until one or more of the light outputs is sensed by the mobile phone 510 at the location of FIG. 6B. For example, each of the LED groupings surrounding the LEDs 632A may briefly provide light output until light output of at least a threshold intensity is sensed via a camera of the mobile phone 510 in the position of FIG. 6B. The mobile phone 510 may provide user gesture data indicative of the light output 634B being received. In some embodiments the user may indicate the position of the mobile phone 510 in FIG. 6B is the target location and the lighting adjustment determined based on such an indication. For example, the user may provide a specific user input via the mobile phone 510 (e.g., press a button, actuate an on-screen element, or speak a command) when it is in the position of FIG. 6B in order to "freeze" the light output 634B. As discussed, in some embodiments the LEDs 632A and 632B (and optionally other adjacent LEDs) may provide coded light output that identify respective of the LEDs 632A and 632B, the camera of the mobile phone 510 utilized to receive the coded light outputs, and the mobile phone may process the received coded light outputs to provide user gesture data that indicates whether the mobile phone 510 is receiving the respective coded light outputs (and/or the intensity of any received coded light outputs). In some embodiments the light output may not be coded. For example, the light output 634B may be provided for a time period without the light output 634A being simultaneously provided and the mobile phone 510 may provide user gesture data indicating that it is receiving light output of at least a threshold intensity during that time period. Based on such user gesture data the lighting controller may determine that the light output received by the mobile phone 510 at the position of FIG. 6B is the light output 634B. In some embodiments light output from LED groupings in addition to LEDs 632A and 632B may be provided and sensed by the mobile phone 510 as it is moved between the locations of FIGS. 6A and 6B. User gesture data may optionally be provided that is indicative of receipt of such additional light output as the phone is moved between the locations of FIGS. 6A and 6B.

In some embodiments, the position of the mobile phone 510 in FIGS. 6A and/or 6B may be determined based on user gesture data determined via input from a GPS sensor of the mobile phone 510 that provides an indication of location of the mobile phone 510. In some embodiments the position of the mobile phone 510 in FIGS. 6A and/or 6B may be determined based on user gesture data determined via input from a magnetic field sensor (e.g., Hall-effect sensor) of the mobile phone 510 that provides an indication of a magnetic field received at the mobile phone 510. Based on the received user gesture data, the lighting controller may determine the location of the mobile phone 510. For example, the lighting controller may generate a known magnetic field (e.g., via one or more electromagnets in the surface 605) such as a magnetic field that generally matches the coverage (e.g., direction and width that matches beam direction and beam width) of light output that may be provided. The magnetic field sensor of the mobile phone 510 may be utilized to generate data indicative of the field strength and the direction of the magnetic field received at the mobile phone 510 and user gesture data indicative of the field strength and direction determined based on the generated data. The determined user gesture data may then be provided to the lighting controller. Based on the known parameters of the magnetic field the lighting controller may determine the location of the mobile phone 510 and/or track the position of the mobile phone 510 in the magnetic field as it is moved. For example, a mapping of locations to magnetic field strengths and/or directions may be utilized to determine the location of the mobile phone 510. Also, for example, a mapping of LEDs to magnetic field strengths and/or directions may be utilized to determine the location of the mobile phone 510 relative to one or more LEDs. In some embodiments individual LEDs and/or LED groupings can be paired with coils creating a magnetic field that generally matches the direction of the beam(s) that can be created by such LEDs and/or LED groupings.

Figure 7A:
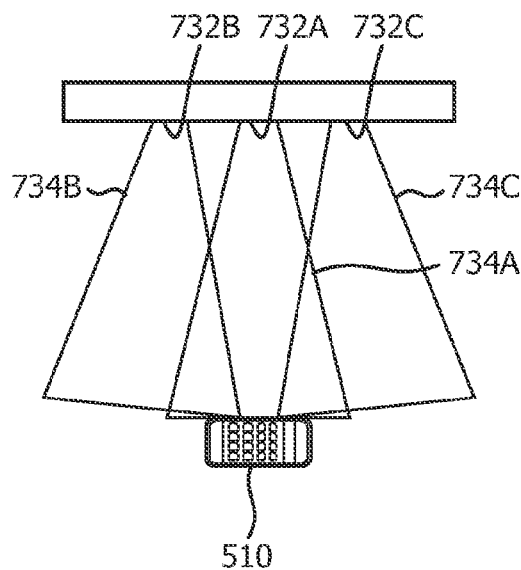
FIGS. 7A and 7B illustrate another example lighting manipulation gesture via physical movement of a mobile computing device.
Figure 7B:
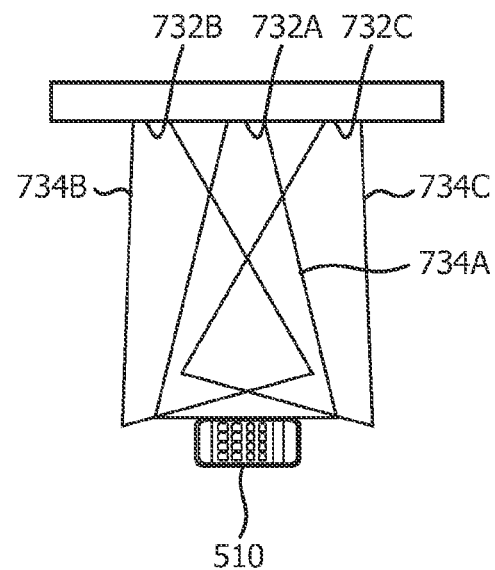

With reference to FIGS. 7A and 7B, the beam angles of light outputs 734A and 734B produced by respective of LED groups 732A and 732B are adjusted to be directed toward the mobile phone 510. The mobile phone 510 may be moved into the position indicated in FIG. 7A. Light output 734A produced by the LEDs 732A, light output 734B produced by the LEDs 732B, and light output 734C produced by the LEDs 732C may all be sensed by the camera of the smartphone 510. In some embodiments the light outputs 734A-C may be coded light output specific to respective of the LEDs 732A-C. The mobile phone 510 may provide user gesture data that is indicative of the intensity of light output received from respective of the light outputs 734A-C via a camera of the mobile phone 510 at the position of the mobile phone 510. Assuming similar light output intensities are provided by light outputs 734A-C in FIG. 7A, the intensity of light output received by mobile phone 510 corresponding to light output 734A will be greater than the intensity of light output received by mobile phone 510 corresponding to light outputs 734B and 734C in the position of FIG. 7A. The user gesture data provided by mobile phone 510 to the lighting controller may indicate this and the lighting controller may adjust the beam angle of light outputs 734B and 734C until further data from mobile phone 510 indicates the intensity of light output received that corresponds to light outputs 734B and 734C satisfies a threshold intensity. In some embodiments the threshold intensity may be based on the intensity of light output received from light output 734A (e.g., a percentage of the intensity of light output 734A). In some embodiments the threshold intensity may be based on a plurality of intensity readings from light output received from light outputs 734B and 734C. For example, for light output 734B a plurality of beam angle adjustments may be made and the threshold intensity for light output 734B based on the maximum light output intensity for light output 734B received at mobile phone 510 from the plurality of beam angle adjustments for light output 734B. In some embodiments the user may indicate the position of the mobile phone 510 in FIGS. 7A and 7B is the target location and the lighting adjustment determined based on such an indication. For example, the user may provide a specific user input via the mobile phone 510 when it is in the position of FIG. 7A in order to set the position of the mobile phone 510 as the target location for light outputs 732A-C.

Based on the data provided by mobile phone 510 to the lighting controller, the lighting controller may determine that the beam angle of light outputs 734B and 734C as illustrated in FIG. 7B provides light output of maximum intensity from respective of LEDs 732B and 732C on mobile phone 510 in its position of FIG. 7B. Based on such an indication, it may be determined that the lighting property adjustment is to adjust the lighting beam angle of light output 734B and 734C to that illustrated in FIG. 7B. In some embodiments the light outputs 734A-C may not be coded. For example, each of the light outputs 734A-C may be provided during non-overlapping time periods when the lighting property adjustments are being determined and the mobile phone 510 may provide user gesture data indicative of the light output intensity during each of the time periods. Based on such an indication, the light output intensity received from each of the light outputs received by the mobile phone 510 may be determined.

In some embodiments, a user of the mobile phone 510 may indicate from which of LED groups 732A-C (and/or other LED groups) light output should be redirected toward the mobile phone 510. For example, a lighting control application executing on the mobile phone 510 may be utilized to present LED groups from which coded light is received and/or other adjacent LED groups to a user, and the user may select one or more of the LED groups via the mobile phone 510. Also, for example, the user may select LED groups to include by pointing the camera of the mobile phone 510 to the LED groups to receive coded light output from the LED groups of at least a threshold intensity, and optionally confirming the inclusion of the LED groups via the mobile phone 510. The user may anchor the target location of the light provided by the LED groups by, for example, pointing at the closest LED group after selection of the LED groups and/or via selection of the closest LED group via the mobile phone 510. The user may further change the light effect location for the same group of LEDs 732A-C from the position shown in FIG. 7B by further movement of the mobile phone 510 (optionally in combination with a user input via the mobile phone 510) and all LED light outputs 734A-C may again be optimized to be directed in the direction of the phone 510 as discussed herein.

In some embodiments, the position of the mobile phone 510 in FIGS. 7A and/or 7B may be determined based on user gesture data determined via input from a magnetic field sensor (e.g., Hall-effect sensor) of the mobile phone 510 that provides an indication of a magnetic field received at the mobile phone 510. Based on the received user gesture data, the lighting controller may determine the location of the mobile phone 510. The magnetic field sensor of the mobile phone 510 may be utilized to generate data indicative of the field strength and the direction of the magnetic field received at the mobile phone 510 and user gesture data indicative of the field strength and direction determined based on the generated data. The determined user gesture data may then be provided to the lighting controller. Based on the known parameters of the magnetic field the lighting controller may determine the location of the mobile phone 510 in the magnetic field and direct light outputs 734B and 734C toward the determined position. For example, a mapping of locations to magnetic field strengths and/or directions may be utilized to determine the location of the mobile phone 510. Also, for example, a mapping of LEDs to magnetic field strengths and/or directions may be utilized to determine the location of the mobile phone 510 relative to one or more LEDs. In some embodiments individual LEDs and/or LED grouping can be paired with coils creating a magnetic field that generally matches the direction of the beam(s) that can be created by such LEDs and/or LED groupings.

With reference to FIGS. 8A and 8B, a light output 834A produced by LEDs 832A is substituted with a light output 834B produced by LEDs 832B based on user movement of the mobile phone 510 from a first orientation (FIG. 8A) to a second orientation (FIG. 8B). The light output 834B is directed at the same target location as the light output 834A, but is at a different beam angle and is provided by a different grouping of LEDs. As illustrated in FIG. 8A, the mobile phone 510 may be moved into the light output 834A produced by the LEDs 832A and a camera of the mobile phone 510 utilized to sense the light output 834A. In some embodiments the light output 834A may optionally be coded light output specific to the LEDs 832A. The mobile phone 510 may provide user gesture data that indicates it is sensing the light output 834A. As discussed herein, the user gesture data may be based on data received via a camera of the mobile phone 510 in response to the camera sensing the provided light output. The user may then move the mobile phone 510 to another orientation as illustrated in FIG. 8B. In some embodiments a user of the mobile phone 510 may provide a specific user input via the mobile phone 510 in order to "grab" the light output 834A and then make the movement of the mobile phone 510 to the orientation in FIG. 8B. The user input may be provided to the lighting controller to indicate the mobile phone 510 is going to be moved to a new orientation and that lighting should be provided that is directed to the mobile phone 510 and is at a beam angle that is based on the new orientation.

The user gesture data to indicate the mobile phone 510 is in the orientation of FIG. 8B may be determined based on physical movement data from one or more sensors of the mobile phone 510, such as an accelerometer of the mobile phone 510. The light output 834B may be provided at a beam angle that is based on the orientation of the mobile phone 510 as indicated by the user gesture data. In some embodiments the beam angle of the light output 834B may be based on an absolute mapping between the mobile phone 510 and the beam angle. For example, if the mobile phone 510 is held in exact horizontal position (FIG. 8A) the light output 834A is provided that is directed straight downwards, whereas if the mobile device is tilted approximately 10° from the horizontal position in a direction (FIG. 8B) the light output 834B is provided that is tilted approximately the same angle in the same direction. In some embodiments the absolute mapping may be made so that the light output is directed to be substantially perpendicular to a front or back of the smartphone that has a camera that may be utilized as a light sensor. This may enable utilization of the camera to receive provided light from the LEDs that can be used to fine-tune the light effect (e.g., by making slight adjustments to the angle of provided light to maximize light intensity of the light output received at the camera).

In some embodiments the beam angle of the light output 834B may be based on a relative mapping between the mobile phone 510 and the beam angle. In such a case the orientation of the mobile phone 510 and provided light beam may not be identical for one or more orientations but the light beam angle may be based on the orientation of the mobile phone 510. For example, in some embodiments a two to one mapping (2° movement of mobile phone 510 is 1° movement for the light beam) may be utilized for one or more orientations of the mobile phone 510. Also, for example, in some embodiments a one to two mapping (1° movement of mobile phone 510 is 2° movement for the light beam) may be utilized for one or more orientations of the mobile phone 510 to control changes in the light beam angle. In some embodiments the granularity of the mapping may depend on the orientation of the mobile phone 510. For example, more granular control may be provided the closer the light beam is to vertical. In some embodiments the light effect is adjusted substantially instantaneously upon receipt of user gesture data that indicates changes in the orientation of the mobile phone 510 such that the user has direct control over the light effect. In some embodiments a user of the mobile phone 510 may provide a specific user input via the mobile phone 510 in order to "freeze" the light output 834B.

Accordingly, when the user is satisfied with the gesture-specified beam angle of light output 834B, the user can press an onscreen button and/or use a spoken voice command (e.g. "freeze", "save") to identify the beam angle of light output 834B as the lighting property adjustment to be made and to optionally leave the gesture control mode.

In some embodiments, available light effects may be determined and/or the light effect may be adjusted and/or fine-tuned based on user gesture data provided via a camera and an orientation sensor of the mobile phone. For example, the mobile phone may be moved between a first orientation and a second orientation. An orientation sensor of the mobile phone may provide user gesture data indicative of the first orientation and the second orientation. A camera of the mobile phone may also provide user gesture data that is indicative of a mapping of LEDs in the first orientation and a mapping of LEDs in the second orientation. The LEDs may provide coded light output to enable determination of the location of one or more LEDs in the first orientation and the location of those one or more LEDs in the second orientation. The user gesture data indicative of the orientations and the mappings may be provided to the controller to enable determination of the directionality of light provided by the one or more LEDs. For example, in the first orientation of the phone a first LED may be mapped to a first location (e.g., the top right corner of an image captured via the camera) and in a second orientation of the phone the LED may be mapped in a second location (e.g., the bottom left corner of an image captured via the camera). Comparing this location information to the first orientation and the second orientation will provide an indication of the directionality of the light output provided by the first LED. This may enable determination of light output direction of the first LED (and optionally additional LEDs) to inform which light effects may be achieved via such LEDs. This may additionally and/or alternatively enable adjustment and/or fine-tuning of the angle of the light output provided by the first LED to change it to a desired direction. Further user gesture data may optionally be determined via the orientation sensor and the camera at additional orientations to determine the new angle of the light output provided by the first LED and such orientation may optionally be further fine-tuned.

With reference to FIGS. 9A and 9B, a light output 934A produced by LEDs 932A is substituted with a light output 934B produced by LEDs 932B based on user movement of the mobile phone 510 from a first orientation (FIG. 9A) to a second orientation (FIG. 9B). The light output 934B is directed at the same target location as the light output 934A, but is at a different beam angle and is provided by a different grouping of LEDs. As illustrated in FIG. 9A, the mobile phone 510 may be moved adjacent to, but outside of the light output 934A produced by the LEDs 932A. The mobile phone 510 and the LEDs 932A may be associated with one another as described in step 200 (e.g., NFC communication). In FIG. 9A, the orientation of the mobile phone is vertical and the orientation of the light output 934A is likewise vertical. The user may then move the mobile phone 510 to another orientation as illustrated in FIG. 9B. In some embodiments a user of the mobile phone 510 may provide a specific user input via the mobile phone 510 in order to "grab" the light output 934A and then make the movement of the mobile phone 510 to the orientation in FIG. 9B. The user input may be provided to the lighting controller to indicate the mobile phone 510 is going to be moved to a new orientation and that lighting should be provided that is directed to the mobile phone 510 and is at a beam angle that is based on the new orientation.

The user gesture data to indicate the mobile phone 510 is in the orientation of FIG. 9B may be determined based on physical movement data of on one or more sensors of the mobile phone 510, such as an accelerometer of the mobile phone 510. The light output 934B may be provided at a beam angle that is based on the orientation of the mobile phone 510 as indicated by the user gesture data. In some embodiments the beam angle of the light output 934B may be based on an absolute mapping between the mobile phone 510 and the beam angle. In some embodiments the beam angle of the light output 934B may be based on a relative mapping between the mobile phone 510 and the beam angle. In some embodiments a user of the mobile phone 510 may provide a specific user input via the mobile phone 510 in order to "freeze" the light output 934B.

Figure 10A:
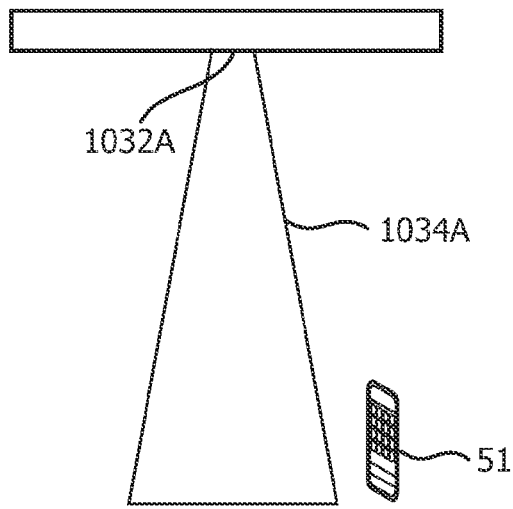
FIGS. 10A and 10B illustrate another example lighting manipulation gesture via physical movement of a mobile computing device.
Figure 10B:
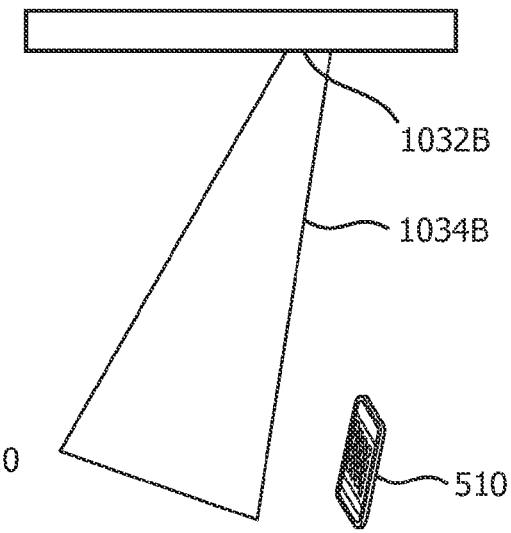

In the examples of FIGS. 9A and 9B, the target location of the light output is kept constant while the LEDs providing the light effect is varied to change the angle of the light beam. Such a configuration may be useful if the location of an object is known, and there is an LED array which is able to create light on this object from various directions. In some embodiments it may additionally and/or alternatively be possible to control the angle of the provided light output while keeping the light source location constant but changing the target location of the light output. For example, with reference to FIGS. 10A and 10B, a light output 1034A produced by LEDs 1032A is substituted with a light output 1034B that is also produced by LEDs 1032B based on user movement of the mobile phone 510 from a first orientation (FIG. 10A) to a second orientation (FIG. 10B). As illustrated in FIGS. 10A and 10B, the beam angle of the light output is altered between FIGS. 10A and 10B, but the LEDs 1032A produce the light output in both FIGS. 10A and 10B. Also, the target location of the light output 1034B in FIG. 10B is different than the target location of the light output 1034A in FIG. 10A, whereas the target location for light outputs 934A and 934B in FIGS. 9A and 9B is substantially the same.

As illustrated in FIG. 10A, the mobile phone 510 may be moved adjacent to, but outside of the light output 1034A produced by the LEDs 1032A. The mobile phone 510 and the LEDs 1032A may be associated with one another as described in step 200 (e.g., NFC communication). In FIG. 10A the orientation of the mobile phone is vertical and the orientation of the light output 1034A is likewise vertical. The user may then move the mobile phone 510 to another orientation as illustrated in FIG. 10B. In some embodiments a user of the mobile phone 510 may provide a specific user input via the mobile phone 510 in order to "grab" the light output 1034A and then make the movement of the mobile phone 510 to the orientation in FIG. 10B. The user input may be provided to the lighting controller to indicate the mobile phone 510 is going to be moved to a new orientation and that lighting should be provided that is directed to the mobile phone 510 and is at a beam angle that is based on the new orientation.

The user gesture data to indicate the mobile phone 510 is in the orientation of FIG. 10B may be determined based on physical movement data from one or more sensors of the mobile phone 510. The light output 1034B may be provided at a beam angle that is based on the orientation of the mobile phone 510 as indicated by the user gesture data. In some embodiments the beam angle of the light output 1034B may be based on an absolute mapping between the mobile phone 510 and the beam angle. In some embodiments the beam angle of the light output 1034B may be based on a relative mapping between the mobile phone 510 and the beam angle. In some embodiments a user of the mobile phone 510 may provide a specific user input via the mobile phone 510 in order to "freeze" the light output 1034B.

In some embodiments, whether light output is adjusted in accordance with FIGS. 9A and 9B or in accordance with FIGS. 10A and 10B may be based on a lighting system configuration and/or lighting system capabilities. In some embodiments a user may choose between the options via a lighting control program executing on the mobile phone 510. In some embodiments which option is utilized may depend on the physical position of the mobile phone 510. For example, if the mobile phone 510 is positioned inside the light output (e.g., FIGS. 8A/8B), the target location of the light output will be kept constant while changing the beam angle, whereas when the mobile phone 510 is positioned outside the light output (e.g., FIGS. 10A/10B), the source location of the light beam will be kept constant. Determination of whether the mobile phone 510 is positioned inside or outside the light output may be based on user gesture data. For example, a camera of the mobile phone 510 may detect coded light output of at least a threshold intensity when it is positioned inside the light output and communicate such via user gesture data. Additional and/or alternative methods of choosing whether light output is adjusted in accordance with FIGS. 9A and 9B or in accordance with FIGS. 10A and 10B may be utilized.

Figure 11A:
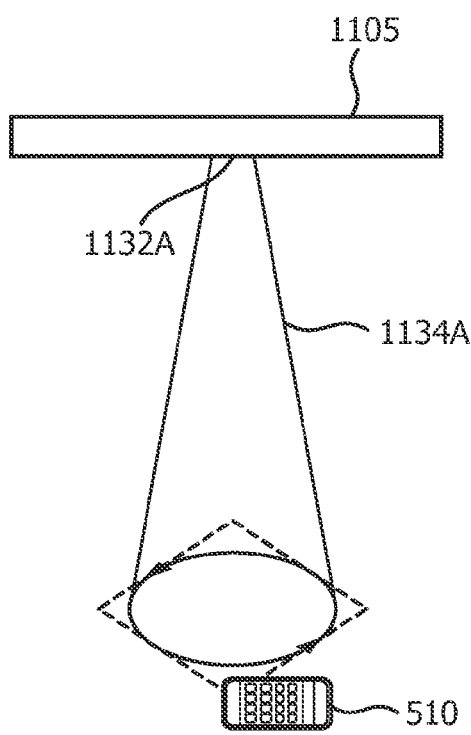
FIGS. 11A and 11B illustrate another example lighting manipulation gesture via physical movement of a mobile computing device.
Figure 11B:
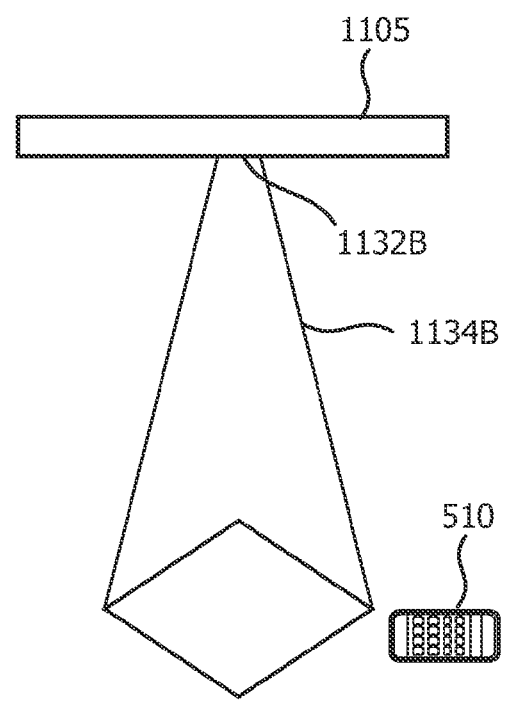

With reference to FIGS. 11A and 11B, a light output 1134A produced by LEDs 1132A is substituted with a light output 1134B produced by LEDs 1132B (which may include some or all of LEDs 1132A) based on a shape boundary defined via movement of the mobile phone 510. As illustrated by the dotted line in FIG. 11A, the mobile phone 510 may be moved in a shape boundary that defines a square. User gesture data may be provided by the mobile phone 510 indicating the movement along the shape boundary and, based on the user gesture data, the lighting controller may apply light output 1134B that has a footprint substantially conforming to the shape boundary.

In some embodiments, the mobile phone 510 may be moved along the path indicated by the dotted line in FIG. 11A and a camera of the mobile phone 510 may detect coded light output at various positions along the path of the dotted line to determine user gesture data that indicates the coded light received via the camera at the various positions. For example, a user of the mobile phone 510 may provide a specific user input via the mobile phone 510 in order to indicate that a desired shape boundary is going to be defined via user movement of the mobile phone 510. In response, the lighting controller may cause all LEDs on the surface 1105 to produce coded light output, with each produced coded light output being specific to one or more of the LEDs on the LED surface 1105. The camera of the mobile phone 510 may be directed toward the LED surface 1105 and the mobile phone 510 moved along the path of the dotted line of FIG. 9A. Based on input from the camera, the mobile phone 510 may determine the coded light output of the greatest intensity at various positions along the path of the dotted line. User gesture data may be provided by the mobile phone 510 that indicates the coded light output of the greatest intensity at various positions along the path of the dotted line. Based on such user gesture data, the lighting controller may generate the light output 1134B of FIG. 11B by causing all LEDs corresponding to such coded light output to be activated and all LEDs located interiorly of such LEDs to be activated. The LEDs located interiorly of such LEDs may be identified, for example, based on a mapping of the LEDs that is accessible by the lighting controller.

Figure 12A:
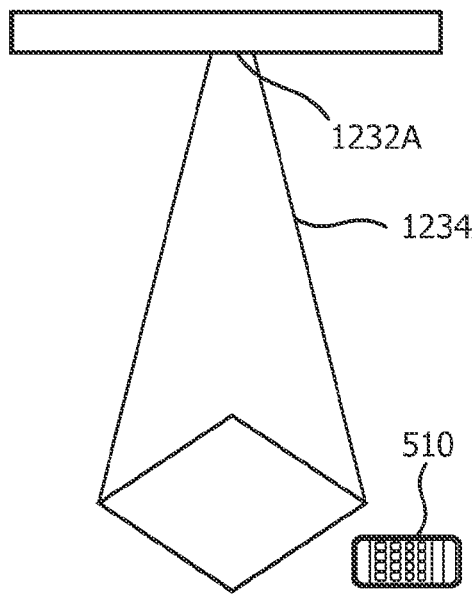
FIGS. 12A and 12B illustrate another example lighting manipulation gesture via physical movement of a mobile computing device.
Figure 12B:
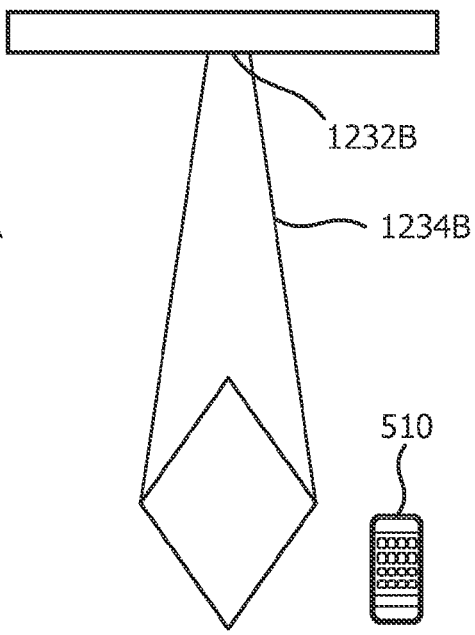

With reference to FIGS. 12A and 12B, a light output 1234A produced by LEDs 1232A is substituted with a light output 1234B produced by LEDs 1232B (which may include some or all of LEDs 1232A) based on user movement of the mobile phone 510 from a first orientation (FIG. 12A) to a second orientation (FIG. 12B). As illustrated in FIG. 12A, the mobile phone 510 may be moved adjacent to, but outside of the light output 1234A produced by the LEDs 1232A. The mobile phone 510 and the LEDs 1232A may be associated with one another as described in step 200 (e.g., NFC communication). In FIG. 12A the orientation of the mobile phone is at a first rotational orientation along a horizontal plane and the light output 1234A defines a footprint having a first width (from left to right in FIG. 12A) and a first height (from top to bottom in FIG. 12A). The user may then rotate the mobile phone 510 to a second rotational orientation along the horizontal plane that is offset from the first rotational orientation by approximately ninety degrees as illustrated in FIG. 12B. User gesture data indicative of the rotational orientation of the mobile phone 510 may be provided to the lighting controller by the mobile phone 510. In some embodiments the user gesture data to indicate the mobile phone 510 is in the orientation of FIGS. 12A and/or 12B may be determined based on physical movement data from an orientation sensor of the mobile phone 510. In some embodiments the user gesture data to indicate the mobile phone 510 is in the orientation of FIGS. 12A and/or 12B may be based on input from a camera sensor of the mobile phone 510. For example, an image from the camera from the position of FIG. 12A may be compared to an image of the camera from the position of FIG. 12B to determine an amount of rotation of the mobile phone from FIG. 12A to FIG. 12B.

In FIG. 12B the light output 1234B defines a footprint having a second width that is shorter than the first width of FIG. 12A and a second height that is taller than the first height of FIG. 12A. In some embodiments a user of the mobile phone 510 may provide a specific user input via the mobile phone 510 in order to "grab" the light output 1234A and then make the movement of the mobile phone 510 to the orientation in FIG. 12B. The user input may be provided to the lighting controller to indicate the mobile phone 510 is going to be moved to a new orientation and that lighting should be provided that has a footprint having a width and/or height that is based on the new orientation. In some embodiments a user of the mobile phone 510 may provide a specific user input via the mobile phone 510 in order to "freeze" the light output 1234B.

In some embodiments, the shape of the light output 1234A of FIG. 12A may be defined as described with respect to FIGS. 11A and 11B. In some embodiments the shape may be defined by selecting a pre-defined shape and/or generating a new shape via a lighting control application executing on the mobile phone 510.

Figure 13A:
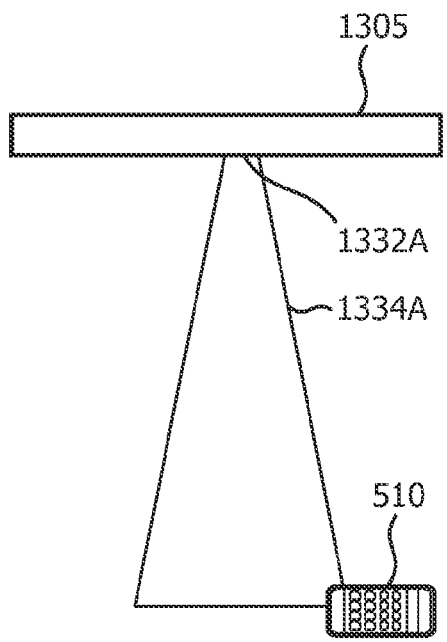
FIGS. 13A and 13B illustrate another example lighting manipulation gesture via physical movement of a mobile computing device.
Figure 13B:
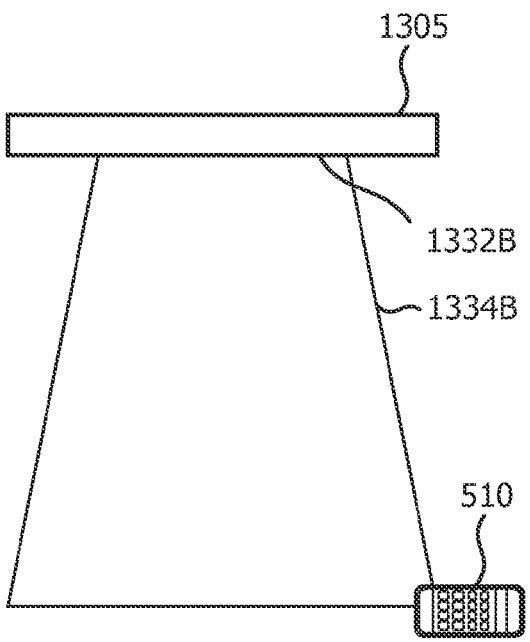

With reference to FIGS. 13A and 13B, a light output 1134A produced by LEDs 1132A is substituted with a light output 1334B produced by LEDs 1332B (which may include some or all of LEDs 1132A). The light output 1334B has a wider beam width than the light output 1334A and may be generated based on user movement of the mobile phone 510 from a first horizontal position (FIG. 13A) to a second horizontal position (FIG. 13B). As illustrated in FIG. 13A, the mobile phone 510 may be moved to the edge of the light output 1334A produced by the LEDs 1332A and a camera of the mobile phone 510 utilized to sense the light output 1334A. In some embodiments the light output 1334A may optionally be coded light output specific to the LEDs 1332A. The mobile phone 510 may provide user gesture data that indicates it is sensing the light output 1334A. The user may then move the mobile phone 510 to another location as illustrated in FIG. 13B. In some embodiments a user of the mobile phone 510 may provide a specific user input via the mobile phone 510 in order to "grab" the light output 1334A and then make the movement of the mobile phone 510 to the orientation in FIG. 13B. The user input may be provided to the lighting controller to indicate the mobile phone 510 is going to be moved to a new location and that lighting should be provided with a beam width that is based on the new location.

The user gesture data to indicate the mobile phone 510 is moved to the new location of FIG. 13B may be based on one or more sensors of the mobile phone 510, such as a GPS or other positional sensor of the mobile phone 510 and/or a camera of the mobile phone 510. For example, the positional sensor may be utilized to determine a distance that the phone has been moved and an indication of this distance provided by the user gesture data. Based on the indicated distance and a mapping of the LEDs, the lighting controller may activate additional LEDs to provide the light output 1334B that has a footprint extending out that distance. Also, for example, LEDs on the surface 1305 may produce coded light output, with each produced coded light output being specific to one or more of the LEDs on the surface 1305. The camera of the mobile phone 510 may be directed toward the LED surface 1305 and based on input from the camera, the mobile phone 510 may determine the coded light output of the greatest intensity at the location of FIG. 13B. User gesture data may be provided by the mobile phone 510 that indicates the coded light output of the greatest intensity at the location of FIG. 13B. Based on such user gesture data, the lighting controller may generate the light output 1334B of FIG. 13B to cause LEDs that are at a similar distance of the LEDs corresponding to such coded light output to be activated, and all LEDs located interiorly of such LEDs to be activated. The LEDs at a similar distance and/or the LEDs located interiorly of such LEDs may be identified, for example, based on a mapping of the LEDs that is accessible by the lighting controller.

An additional and/or alternative way to control beam width may be by moving the mobile phone 510 vertically instead of horizontally. For example, with reference to FIGS. 14A and 14B, a light output 1434A produced by LEDs 1432A is substituted with a light output 1434B produced by LEDs 1432B (which may include some or all of LEDs 1432A). The light output 1434B has a wider beam width and may be generated based on user movement of the mobile phone 510 from a first vertical position (FIG. 14A) to a second vertical position (FIG. 14B). For example, placing the mobile phone 510 relatively low as illustrated in FIG. 14A may cause a narrow beam such as light output 1434A to be generated and moving the mobile phone vertically upward closer to the LED surface 1405 as illustrated in FIG. 14B may gradually widen the light beam as illustrated by light output 1434B. In some embodiments the user gesture data to indicate the mobile phone 510 is moved up and/or down may be based on input from an orientation sensor of the mobile phone 510. In some embodiments the user gesture data to indicate the mobile phone 510 is moved up and/or down may be based on input from a camera sensor of the mobile phone 510. For example, an image from the camera from a first vertical position may be compared to an image of the camera from a second vertical position to determine an amount of movement up and/or down (e.g., by comparing the size and/or location of certain reference objects).

With reference to FIGS. 15A and 15B, a light output 1534A of a first color produced by LEDs 1532A is substituted with a light output 1534B of a second color produced by LEDs 1532B (which may include some or all of LEDs 1532A) based on user movement of the mobile phone 510 from a first orientation (FIG. 15A) to a second orientation (FIG. 15B). As illustrated in FIG. 15A, the mobile phone 510 may be moved adjacent to, but outside of the light output 1534A produced by the LEDs 1532A. The mobile phone 510 and the LEDs 1532A may be associated with one another as described in step 200 (e.g., NFC communication). In FIG. 15A the orientation of the mobile phone is at a first orientation and the light output defines a first color. The user may then move the mobile phone 510 to a second orientation that is offset from the first rotational orientation by approximately ninety degrees as illustrated in FIG. 12B. User gesture data indicative of the orientation of the mobile phone 510 may be provided to the lighting controller by the mobile phone 510. In some embodiments the user gesture data to indicate the mobile phone 510 is in the orientation of FIGS. 15A and/or 15B may be based on input from an orientation sensor of the mobile phone 510. In some embodiments, the user gesture data to indicate the mobile phone 510 is in the orientation of FIGS. 15A and/or 15B may be based on input from a camera sensor of the mobile phone 510. For example, an image from the camera from the position of FIG. 15A may be compared to an image of the camera from the position of FIG. 15B to determine the change in orientation of the mobile phone from FIG. 15A to FIG. 15B.

In FIG. 15B the light output 1534B defines a light output having a second color that is distinct from the first color of light output 1534A of FIG. 15A. In some embodiments a user of the mobile phone 510 may provide a specific user input via the mobile phone 510 in order to "grab" the light output 1534A and then make the movement of the mobile phone 510 to the orientation in FIG. 15B. The user input may be provided to the lighting controller to indicate the mobile phone 510 is going to be moved to a new orientation and that lighting should be provided that has a color that is based on the new orientation. In some embodiments a user of the mobile phone 510 may provide a specific user input via the mobile phone 510 in order to "freeze" the light output 1534B. In some embodiments, color temperature may be adjusted in a similar manner as illustrated in FIGS. 15A and 15B.

In some embodiments, a lighting control application executing on mobile phone 510 may enable selection of a color wheel to enable changing of the color in correspondence with the color wheel. For example, the mobile phone 510 may be rotated in a desired direction toward a desired color on the color wheel displayed on the mobile phone 510 to produce a color in that direction on the color wheel. In some embodiments the particular range of color and/or color temperature adjustments may be selected via the mobile phone 510. For example, a color wheel may be selected from a plurality of color wheels such as a full color wheel, a fine-tuned color wheel, and/or a color temperature wheel for controlling white light (e.g., cool to warm).

Figure 16A:
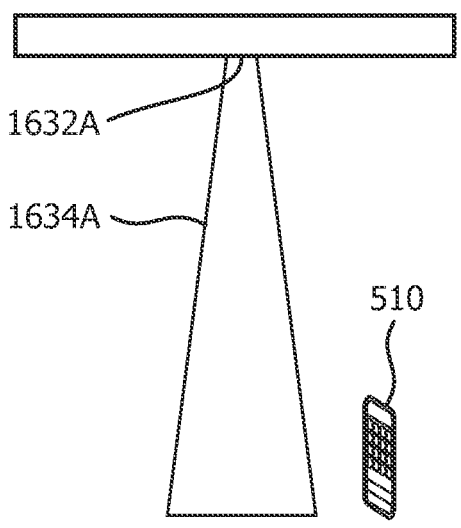
FIGS. 16A and 16B illustrate another example lighting manipulation gesture via physical movement of a mobile computing device.
Figure 16B:
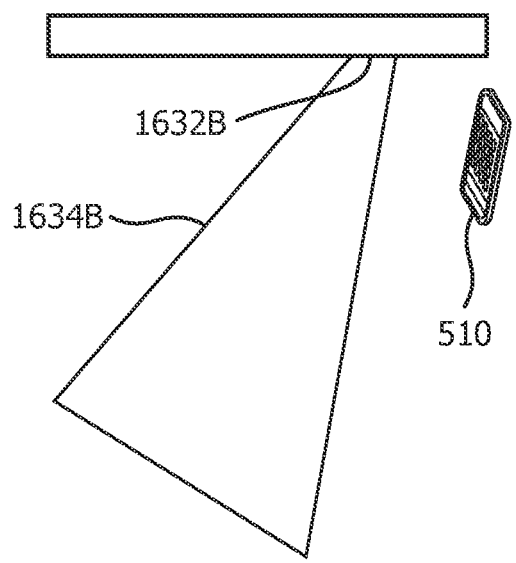

In some embodiments, multiple light effect properties may be controlled via movement of the mobile phone 510. For example, as illustrated in FIGS. 16A and 16B, a light output 1634A of a first beam width and a first beam angle produced by LEDs 1632A is substituted with a light output 1634B of a second beam width and second beam angle produced by LEDs 1632B (which may include some or all of LEDs 1632A). The beam angle is adjusted based on user movement of the mobile phone 510 from a first orientation (FIG. 16A) to a second orientation (FIG. 16B), as described, for example, with respect to FIGS. 9A and 9B. The beam width is adjusted based on user movement of the mobile phone 510 from a first vertical position (FIG. 16A) to a second vertical position (FIG. 16B), as described, for example, with respect to FIGS. 14A and 14B. Additional and/or alternative controls of multiple lighting effects may be accomplished and may optionally include control of more than two lighting effects.

Figure 3:
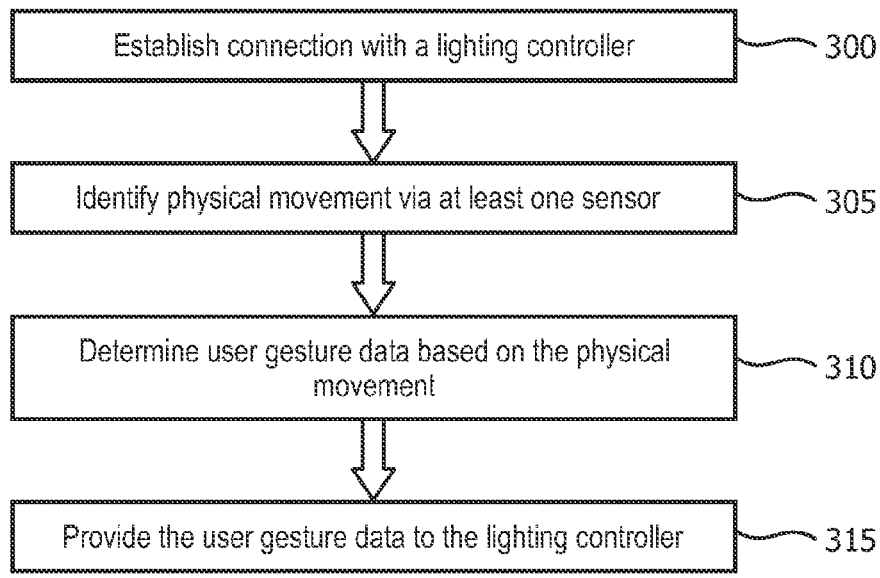
FIG. 3 illustrates a flow chart of an example method of providing user gesture data to at least one lighting controller to adjust lighting.

Referring to FIG. 3, a flow chart of an example method of providing user gesture data to at least one lighting controller to adjust lighting is illustrated. Other implementations may perform the steps in a different order, omit certain steps, and/or perform different and/or additional steps than those illustrated in FIG. 3. For convenience, aspects of FIG. 3 will be described with reference to one or more components that may perform the method. The components may include, for example, the mobile computing device 110 of FIG. 1 and/or one or the mobile computing device 510 of FIGS. 4A-15B. Accordingly, for convenience, aspects of FIGS. 1 and 4A-15B may be described in conjunction with FIG. 3.

At step 300 a connection with a lighting controller is established. For example, the mobile computing device 110 may establish a connection with the lighting controller 120. The connection may be established based on receipt of data (e.g., connection initiation data) from the lighting system 100 at the mobile phone 110 and/or based on providing data from the mobile phone 110 to the lighting system 100. Step 300 may share one or more aspects in common with step 200 of the method of FIG. 2.

At step 305 physical movement data is identified via at least one sensor. For example, data from one or more sensors described with respect to sensor 112 of the mobile computing device 110 may be received and indicative of one or more physical movements of the mobile computing device 110 by a user. Also, for example, data from one or more sensors described with respect to mobile phone 510 in FIGS. 4A-15B may be received indicative of physical movement of the mobile computing device 510. The sensors may include, for example, a camera, a magnetic field sensing transducer (e.g., a hall-effect sensor), and/or an orientation sensor (e.g., a magnetometer, gyrocompass, gyroscope; accelerometer; three-axis electronic compass).

At step 310 user gesture data is determined based on the physical movement data identified at step 305. In some embodiments the user gesture data may be the same as the raw physical movement data identified via the at least one sensor at step 305. In some embodiments the mobile phone 110 and/or 510 may process the physical movement data to generate refined user gesture data. For example, a lighting control application executing on a mobile phone may be utilized to convert the physical movement data into a desired format. For example, physical movement data from an orientation sensor may be converted to a predefined 8 bit code that is indicative of an adjusted orientation of a mobile phone. Also, for example, the physical movement data may include multiple images captured via a camera sensor of a mobile phone and the images may be analyzed to determine user gesture data that is indicative of the movement of the mobile phone based on analysis of the images. For example, one or more reference objects in consecutive images may be analyzed to determine if the position and/or size of the reference objects is altered and, based on such determination physical movement may be determined and user gesture data that indicates such physical movement also determined. User gesture data may include user gesture data such as that described herein with respect to FIGS. 5A-15B.

At step 315 the user gesture data is provided to a lighting controller to implement one or more lighting adjustments based on the user gesture data. For example, when the user gesture data is the same as the raw physical movement data identified via the at least one sensor at step 305, the user gesture data may be provided to the lighting controller and the lighting controller may optionally further process such user gesture data. Lighting property adjustments implemented by the lighting controller may include one or more lighting property adjustments such as that described herein with respect to FIGS. 5A-15B (e.g., lighting intensity, color, color temperature, beam width, and/or beam direction).

Figure 4:
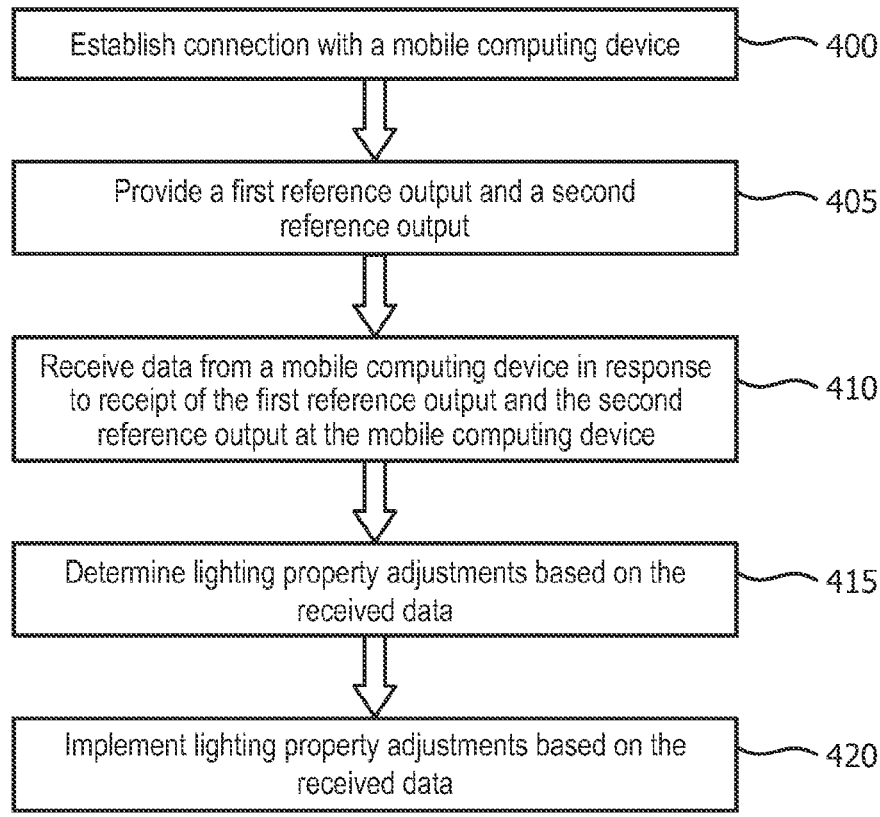
FIG. 4 illustrates a flow chart of another example method of adjusting lighting via input from a mobile computing device.

Referring to FIG. 4, a flow chart of another example method of adjusting lighting via input from a mobile computing device is illustrated. Other implementations may perform the steps in a different order, omit certain steps, and/or perform different and/or additional steps than those illustrated in FIG. 4. For convenience, aspects of FIG. 4 will be described with reference to one or more components of a lighting system that may perform the method. The components may include, for example, one or more of the components of lighting system 100 of FIG. 1 and/or one or more components of FIGS. 5A-16B. Accordingly, for convenience, aspects of FIGS. 1 and 5A-16B may be described in conjunction with FIG. 4.

At step 400 a connection with a mobile computing device is established. For example, the lighting controller 120 may establish a connection with the mobile computing device 110. In some embodiments a connection may be established in response to a user action with the mobile computing device 110. In some embodiments the user action may be directed particularly to a group of one or more LEDs the user wishes to control. Step 400 may share one or more aspects in common with step 200 of the method of FIG. 2 and/or step 300 of the method of FIG. 3.

At step 405 a first reference output and a second reference output are provided. In some embodiments the first and second reference outputs may include a first and second light output. In some of those embodiments the first and second light outputs may each be a specific coded light output.

For example, with reference to FIGS. 7A and 7B, light output 734A may be a first reference output and light output 734B may be a second reference output. Light outputs 734A and 734B may be coded light output specific to respective of the LED groups 732A and 732B. Also, for example, light output 734A may be provide during first time periods and light output 734B may be provided during second time periods. At least a portion of some of the first time periods may be non-overlapping with at least a portion of some of the second time periods.

At step 410 data is received from a mobile computing device in response to the mobile computing device receiving the first reference output and the second reference output. For example, the lighting controller 120 may receive the data from the mobile computing device 110. The data may be provided via the connection established between the lighting controller 120 and the mobile computing device 110 at step 400. The data may be received from the mobile computing device 110 based on input received via one or more sensor 112 of the mobile computing device 110. For example, with reference to FIG. 7A, the mobile phone 510 may provide data that is indicative of the intensity of light output received from respective of the light outputs 734A and 734B via a camera of the mobile phone 510 at the position of the mobile phone 510. Assuming similar light output intensities are provided by light outputs 734A and 734B in FIG. 7A, the intensity of light output received by mobile phone 510 corresponding to light output 734A will be greater than the intensity of light output received by mobile phone 510 corresponding to light output 734B in the position of FIG. 7A. The user gesture data provided by mobile phone 510 to the lighting controller may indicate this. In some embodiments the data may be determined by the mobile computing device 110 as described with respect to step 310 of FIG. 3.

At step 410 at least one lighting property adjustment is determined based on the received data. For example, a lighting property adjustment of the intensity, color, beam width, and/or beam direction of light output provided by one or more LEDs may be determined based on the received data. At step 415 the lighting property adjustments determined at step 410 are implemented. For example, the lighting controller may implement the lighting property adjustments by activating one or more LEDs, deactivating one or more LEDs, changing light output characteristics (e.g., color, brightness, color temperature) of one or more LEDs, and/or altering one or more mechanical and/or electrical optical structures associated with one or more LEDs (e.g., repositioning optical lenses associated with one or more LEDs, changing optical characteristics of one or more optical lenses).

For example, the lighting controller may adjust the beam angle of light output 734B to increase the intensity of light output 734B on mobile phone 510. For example, light output the beam angle of light output 734B may be adjusted until further data from mobile phone 510 indicates the intensity of light output received that corresponds to light output 734B satisfies a threshold intensity. In some embodiments the threshold intensity may be based on the intensity of light output received from light output 734A (e.g., a percentage of the intensity of light output 734A). In some embodiments the threshold intensity may be based on a plurality of intensity readings from light output received from light output 734B. Step 405 may share one or more aspects in common with step 215 of the method of FIG. 2. Although specific examples for FIG. 4 are provided with respect to FIG. 7A, it is understood that additional examples of lighting property adjustments based on data from a mobile computing device that is received in response to a first and second reference output are discussed herein. For example, examples are provided herein of user gesture data from a mobile phone that is based on first and second reference outputs (e.g., first and second coded light) and utilizing such user gesture data to determine movement of the mobile computing and adjust light output based on such determined movement.

In some embodiments, a lighting controller may provide feedback to a user when the user is adjusting light output via a mobile computing device according to one or more methods described herein. Feedback may be, for example, visual, audible, and/or tactile. For example, feedback may be provided to indicate when a light output may not be adjusted in accordance with user gesture data provided via a mobile computing device. For example, user gesture data may indicate a desire for light output at a beam angle that may not be achieved by the particular LED-based lighting unit configuration and feedback may be provided to indicate that such light output may not be achieved. For example, the lighting controller may provide a feedback command to the mobile computing device to cause the mobile computing device to alert the user via audible (e.g., a beep), tactile (e.g., a vibration), and/or visual (e.g., a message) output when the light output has reached the extent of its effect range. For example, a feedback command may be provided when the light output has reached a maximum beam angle, minimum light intensity, maximum light intensity, minimum beam size, and/or maximum beam size.

Also, for example, the LED-based lighting unit may provide feedback. For example, the LED-based lighting unit may be able to produce colored light output and such colored light output can be used to provide a noticeable visual feedback to the user that a light output may not be achieved. Also, for example, LEDs of the LED-based lighting unit may be flashed on and off repeatedly to provide visual feedback to the user that light output may not be achieved. Also, for example, audible feedback may be provided via a speaker of the LED-based lighting unit to provide audible feedback to the user that light output may not be achieved.

In some embodiments, feedback may additionally and/or alternatively be provided to a user to indicate that the light output is actively being adjusted. For example, when light output adjustment via a mobile computing device begins and/or while light output adjustment is occurring, the light output to be adjusted could be switched into a specific RGB color. Also, for example, when light output adjustment via a mobile computing device begins and/or while light output adjustment is occurring, audible, visual, and/or tactile feedback may be provided to the user via the mobile computing device. In some embodiments, feedback may additionally and/or alternatively be provided to a user to indicate that adjustment of the light output completed. For example, after the light output adjustment is finished the beam could be frozen with a user interface element on the mobile computing device screen and then the light output could turn back to the initial white light effect from a specific RGB adjustment color.

In some embodiments, once the light output adjustment is satisfactory for the user, the user may want to terminate the ad-hoc connection between the Smartphone and the LED array. This can be done using a basic time-out function. For example, if the light effect is not being controlled for more than 1 minute, the ad-hoc connection is terminated. In some embodiments, an explicit user action may be used to terminate the connection. For example, making another NFC gesture such as that described with respect to steps 200 and/or 300, by actuating a button or user interface element on the mobile computing device, and/or by closing a lighting control application on the mobile computing device.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing between parentheses in the claims are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of adjusting lighting via input from a mobile computing device, comprising:

providing first and second user gesture data reference outputs;
establishing a connection with a mobile computing device of a user;
receiving user gesture data from the mobile computing device in response to at least one physical movement of the mobile computing device in space by the user, wherein the user gesture data is based on a comparison between the first and second user gesture data reference outputs;
determining lighting property adjustments for light output produced by one or more LEDs of a LED-based lighting unit based on the user gesture data; and
implementing the lighting property adjustments in response to the user gesture data.

2. The method of claim 1, further comprising receiving a lighting property adjustment completion indication from the mobile computing device and fixing the lighting property adjustments in response to the lighting property adjustment completion indication.

3. The method of claim 1, further comprising receiving a lighting property adjustment initiation indication from the mobile computing device and implementing the lighting property adjustments in response to the lighting property initiation indication.

4. The method of claim 1, wherein the first and second user gesture data reference outputs include a plurality of coded light outputs and the user gesture data is indicative of receipt of at least two of the coded light outputs at an optical sensing device of the mobile computing device.

5. The method of claim 4, wherein the first and second user gesture data reference outputs include a first coded light output generated by a first LED of the LEDs and a second coded light output generated by a second LED of the LEDs, and the user gesture data is indicative of receipt of the first coded light output and the second coded light output.

6. The method of claim 5, wherein the user gesture data is indicative of receipt of the first coded light output and the second coded light output simultaneously.

7. The method of claim 1, wherein the user gesture data reference output includes at least one magnetic field and the user gesture data is indicative of strength of the magnetic field at the mobile computing device.

8. The method of claim 1, further comprising receiving target area data from the mobile computing device, the target area data indicative of a target area for light output of the one or more LEDs; and wherein determining the lighting property adjustments for one or more LEDs is based on the target area data to maintain the light output in the target area.

9. The method of claim 1, wherein establishing the connection with the mobile computing device includes generating an identifier for the LED-based lighting unit, the identifier being readable by the mobile computing device.

10. The method of claim 1, wherein the space is in the path of light output from the one or more LEDs of the LED-based lighting unit.

11. A method of providing user gesture data to at least one lighting controller to adjust lighting, comprising:
establishing a connection with at least one lighting controller controlling one or more LEDs of a LED-based lighting unit;
identifying physical movement data via at least one sensor of a mobile computing device;
determining user gesture data based on the physical movement data;
providing the user gesture data to the lighting controller to implement lighting property adjustments for light output from the one or more LEDs based on the user gesture data; and
determining target area data based on anchor area input received via the mobile computing device, the target area data indicative of a target area for light output of the one or more LEDs and based on the position of the mobile computing device when the target area input is received.

12. The method of claim 11, further comprising identifying a lighting property adjustment completion indication and providing the lighting property adjustment completion indication to the lighting controller to fix the lighting property adjustments for the one or more LEDs.

13. The method of claim 11, further comprising receiving at least one user gesture data reference output via the sensor, wherein the physical movement data is based on the user gesture data reference output.

14. The method of claim 13, wherein the user gesture data reference output includes a plurality of coded light outputs, the sensor includes an optical sensing device, and the physical movement data is based on receipt of at least one of the coded light outputs at the optical sensing device.

15. The method of claim 14, wherein the user gesture data is indicative of receipt of the first coded light output and the second coded light output simultaneously.

16. The method of claim 15, wherein the user gesture data is indicative of a first strength of the first coded light output and a second strength of the second coded light output.

17. The method of claim 11, wherein the physical movement is in the path of light output from the one or more LEDs for which the lighting property adjustments are implemented based on the user gesture data.

18. A lighting apparatus including a memory and a controller operable to execute instructions stored in the memory, comprising instructions to:
establish a connection with a mobile computing device of a user;
receive user gesture data from the mobile computing device in response to at least one physical movement of the mobile computing device in space by the user;
determine lighting property adjustments for light output produced by one or more LEDs of a LED-based lighting unit based on the user gesture data;
implement the lighting property adjustments in response to the user gesture data; and
determine target area data based on anchor area input received via the mobile computing device, the target area data indicative of a target area for light output of the one or more LEDs and based on the position of the mobile computing device when the target area input is received.

19. A lighting system comprising:
at least one LED-based lighting unit having at least one adjustable lighting property;
at least one controller in electrical communication with said light source;
wherein said at least one controller:
provides first and second user gesture data reference outputs;
establishes a connection with a mobile computing device of a user;
receives user gesture data from the mobile computing device in response to at least one physical movement of the mobile computing device in space by the user, wherein the user gesture data is based at least in part on both the first and second user gesture data reference outputs;

determines lighting property adjustments for light output produced by one or more LEDs of a LED-based lighting unit based on the user gesture data; and implements the lighting property adjustments in response to the user gesture data.

* * * * *